(12) United States Patent
Torjesen et al.

(10) Patent No.: US 11,022,071 B2
(45) Date of Patent: Jun. 1, 2021

(54) LOAD DISTRIBUTION PANEL ASSEMBLY, SYSTEM AND METHOD

(71) Applicant: The Boeing Company, Chicago, IL (US)

(72) Inventors: Luke D. Torjesen, Charleston, SC (US); Robert D. Morrow, Summerville, SC (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 15/387,620

(22) Filed: Dec. 21, 2016

(65) Prior Publication Data

US 2018/0230940 A1     Aug. 16, 2018

(51) Int. Cl.
  *F02K 1/72*       (2006.01)
  *F02K 1/76*       (2006.01)
  *B64D 29/06*      (2006.01)
  *F02K 1/58*       (2006.01)
  *B64D 33/04*      (2006.01)

(52) U.S. Cl.
  CPC .............. *F02K 1/72* (2013.01); *B64D 29/06* (2013.01); *F02K 1/58* (2013.01); *F02K 1/763* (2013.01); *B64D 33/04* (2013.01); *F05D 2220/323* (2013.01); *Y02T 50/60* (2013.01)

(58) Field of Classification Search
  CPC ... F02K 1/72; F02K 1/723; F02K 1/58; B64D 29/06
  See application file for complete search history.

(56) References Cited

U.S. PATENT DOCUMENTS

| | | | |
|---|---|---|---|
| 3,503,211 A | | 3/1970 | Medawar et al. |
| 3,831,376 A | | 8/1974 | Moorehead |
| 4,185,798 A | | 1/1980 | Dickenson |
| 4,458,863 A | | 7/1984 | Smith |
| 4,704,862 A | | 11/1987 | Dennison et al. |
| 4,716,724 A | | 1/1988 | Newton |
| 5,239,822 A | | 8/1993 | Buchacher |
| 5,725,354 A | * | 3/1998 | Wadia ..................... F01D 5/147 416/224 |

(Continued)

OTHER PUBLICATIONS

European Patent Office Extended European Search Report, dated May 23, 2018, for counterpart foreign application No. EP 17202926.6, Applicant the Boeing Company, 10 pages.

(Continued)

*Primary Examiner* — Katheryn A Malatek
(74) *Attorney, Agent, or Firm* — Kwan & Olynick LLP

(57) ABSTRACT

There is provided a load distribution panel assembly for a gas turbine engine. The assembly has a panel structure having at least one circumferential structural panel having a first end, and a second end coupled to a fixed structure of the gas turbine engine. The circumferential structural panel has a first compliant portion extending away from the first end, and has a second stiffened portion angled with respect to and extending radially away from the first compliant portion, and terminating at the second end. The second stiffened portion has a closed stiffened cavity portion integral with a perimeter flange portion. The panel assembly converts fore/aft point load(s) applied to it by load applying apparatus(es), to hoop tension and compression loads, and reacts a load offset in in-plane load(s), to provide uniform load distribution of the fore/aft point load(s) to the fixed structure.

18 Claims, 17 Drawing Sheets

(56) References Cited

U.S. PATENT DOCUMENTS

| | | | |
|---|---|---|---|
| 5,758,488 A | 6/1998 | Batey | |
| 5,853,148 A * | 12/1998 | Standish | F02K 1/72 244/110 B |
| 6,151,883 A * | 11/2000 | Hatrick | F15D 1/12 60/226.2 |
| 6,170,254 B1 * | 1/2001 | Cariola | F02K 1/72 60/226.2 |
| 6,434,927 B1 | 8/2002 | Stretton | |
| 6,474,059 B2 | 11/2002 | Stretton | |
| 6,546,715 B1 | 4/2003 | Blevins et al. | |
| 6,824,191 B2 | 11/2004 | Sternberger et al. | |
| 6,915,984 B2 | 7/2005 | Sternberger et al. | |
| 7,600,371 B2 | 10/2009 | Sternberger | |
| 8,398,018 B2 | 3/2013 | Welch | |
| 8,511,062 B2 | 8/2013 | Ramlaoui et al. | |
| 2003/0089824 A1 * | 5/2003 | Stemberger | B64D 33/04 244/110 B |
| 2004/0159741 A1 | 8/2004 | Sternberger et al. | |
| 2006/0121265 A1 * | 6/2006 | Thompson | F01D 5/147 428/293.4 |
| 2007/0084964 A1 * | 4/2007 | Stemberger | B64D 29/06 244/53 R |
| 2008/0060342 A1 | 3/2008 | Udall | |
| 2010/0148012 A1 | 6/2010 | McDonough et al. | |
| 2010/0212286 A1 | 8/2010 | West et al. | |
| 2011/0215193 A1 | 9/2011 | Welch et al. | |
| 2014/0150403 A1 | 6/2014 | Stuart et al. | |

OTHER PUBLICATIONS

U.S. Appl. No. 13/370,304, filed Feb. 9, 2012, Title: "Bracket Assembly and Method for Thrust Reverser", Inventor John A. Weidler.

European Application Serial No. 17202926.6, Office Action dated Aug. 4, 2020, 7 pgs.

* cited by examiner

LOAD DISTRIBUTION PANEL SYSTEM 10

LOAD DISTRIBUTION PANEL ASSEMBLY 60 | PANEL 61 | PANEL PORTIONS 62a, 62b | CONICAL SHAPE 72

CIRCUMFERENTIAL STRUCTURAL PANEL 70, 70a | FIRST END 74a | SECOND END 74b

FIRST COMPLIANT PORTION 80 | COMPLIANT BARREL SECTION 80a

SECOND STIFFENED PORTION 82 | STIFFENED BULB PORTION 82a

CLOSED STIFFENED CAVITY PORTION 87a | PERIMETER LIP PORTION 87b

SANDWICH STRUCTURE 116 | NON-QUASI ISOTROPIC LAMINATE 117

CORE INTERIOR 118 | FILLED CORE INTERIOR 118a | HOLLOW CORE INTERIOR 118b

STIFFENED MATERIAL 120 | HONEYCOMB CORE 120a | FOAM CORE 120b

GEOMETRIC CONFIGURATION 122
PARALLELOGRAM 122a | TRAPEZOID 122b | RECTANGLE 122c | ELLIPSE 122d

STIFFNESS 124
FIRST COMPLIANT PORTION BENDING AND TORSION STIFFNESS 124a
SECOND STIFFENED PORTION BENDING AND TORSION STIFFNESS 124b

ANGLE 126 | REINFORCED TORQUE CAPABLE SECTION 128

IN-PLANE LOAD(S) 147 | LOAD PATH 148 | FORE/AFT POINT LOAD(S) 142 | STRUCTURAL LOAD(S) 145

LOAD OFFSET 146 | HOOP TENSION LOAD 152 | HOOP COMPRESSION LOAD 154

OUTER BLADE FITTING REACTION FORCE 144 | UNIFORM LOAD DISTRIBUTION 156

HINGING EFFECT 157 | FORCE COUPLE 158 | REDUCED STRUCTURAL REINFORCEMENT 162

REDUCED COMPLEXITY 164 | REDUCED PART COUNT 166 | MOMENT 159

CLEVIS MEMBER (OPTIONAL) 88 | LOAD APPLYING APPARATUS 50 | TRAS ACTUATOR 50a

TRAS ATTACH FITTING 112

UPPER BEAM ASSEMBLY 96 | UPPER ELEMENT 68 | UPPER BEAM 98

LOWER BEAM ASSEMBLY 100 | LOWER ELEMENT 102 | LOWER BEAM 104

---

VEHICLE 12 | AIRCRAFT 12a | AUTOMOBILE 12b | WATERCRAFT 12c | SUBMARINE 12d

ENGINE 16 | GAS TURBINE ENGINE 16a | THRUST REVERSER ASSEMBLY 26

THRUST REVERSER COWL 24 | INLET COWL 30 | FIXED MEMBER 32 | TRANSLATING SLEEVE 34

PLURALITY OF CASCADE MEMBERS 40

FIXED STRUCTURE 76 | GAS TURBINE ENGINE FIXED STRUCTURE 76a
TRANSLATING SLEEVE BULKHEAD 78 | LOAD TRANSFER FITTING 132

ENGINE FAN CASE 48 | OUTER BLADE FITTING 52 | OUTER GROOVE FITTING 54

FIG. 7

LOAD DISTRIBUTION PANEL ASSEMBLY, SYSTEM AND METHOD

FIELD

The disclosure relates generally to structures for distributing loads, and more particularly, to assemblies, systems and methods for providing uniform load distribution in a structure, such as a conical or cylindrical structure, in a vehicle, such as an aircraft.

BACKGROUND

Vehicles, such as commercial and military jet aircraft, use thrust reversers on the aircraft's jet engines, such as gas turbine engines, to reverse fan exhaust air from a jet engine in order to reduce the aircraft's speed after landing. Such thrust reversers typically comprise a translating cowl or sleeve that opens when the thrust reversers are activated. The translating cowl or sleeve is controlled by actuators, such as thrust reverser actuation system (TRAS) actuators, attached to a fixed engine structure, which introduces a point load into the fixed engine structure.

Known assemblies, systems and methods, may not effectively or uniformly distribute the point load into the fixed engine structure due to the complexity of the design and/or heavy weight of support structures required to overcome any load offset between the actuators and the fixed engine structure, and to minimize or avoid out-of-plane loads. For example, one known system requires the use of large metallic fittings and thick composite laminates to control deflections induced by the point load. Such large metallic fittings and thick composite laminates may add significant weight to the jet engine, such as the gas turbine engine, and in turn, may increase the overall weight of the vehicle.

Moreover, secondary stiffening features may also be required to control deflection away from the load application point. Such secondary stiffening features may further increase the weight of the jet engine, such as the gas turbine engine, may increase the part count if a large amount of structural reinforcement is required, and may increase the complexity or have a complex geometry, which, in turn, may increase the weight and cost of the jet engine.

Accordingly, what is needed is an assembly, system and method for providing uniform load distribution in a structure, such as conical or cylindrical structure, in a vehicle, that provides a simple design requiring minimal structural reinforcement or support to overcome a load offset, that provides a reduced complexity and a reduced part count, while also effectively and uniformly distributing one or more point loads into the structure, and that provides advantages over known assemblies, systems, and methods.

SUMMARY

This need for an assembly, system and method for providing uniform load distribution in a structure, such as a conical or cylindrical structure, in a vehicle is satisfied. As discussed in the below detailed description, embodiments of the assembly, system and method may provide significant advantages over existing assemblies, systems and methods.

In an embodiment of the disclosure, there is provided a load distribution panel assembly for providing a uniform load distribution in a vehicle. The load distribution panel assembly comprises a panel structure comprising at least one circumferential structural panel.

The circumferential structural panel comprises a first end and a second end. The first end is coupled to a fixed structure in the vehicle. The circumferential structural panel further comprises a first compliant portion extending away from the first end. The first compliant portion has a first inner surface and a first outer surface.

The circumferential structural panel further comprises a second stiffened portion that is angled with respect to the first compliant portion and extends radially away from the first compliant portion, and terminates at the second end. The second stiffened portion has a second inner surface and a second outer surface, and has a closed stiffened cavity portion integral with a perimeter flange portion.

The load distribution panel assembly converts one or more fore/aft point loads applied to the load distribution panel assembly by one or more load applying apparatuses, to a hoop tension load and a hoop compression load, and reacts a load offset between the one or more load applying apparatuses and the load distribution panel assembly, in one or more in-plane loads. This provides the uniform load distribution of the one or more fore/aft point loads, through the load distribution panel assembly, and to the fixed structure.

In another embodiment of the disclosure, there is provided a load distribution panel system for providing a uniform load distribution in a gas turbine engine of a vehicle. The load distribution panel system comprises a load distribution panel assembly having a panel structure with at least two panel portions. Each panel portion comprises a circumferential structural panel. Each circumferential structural panel has a conical shape and comprises a first end and a second end. The first end is coupled to a fixed structure of the gas turbine engine of the vehicle.

Each circumferential structural panel further comprises a compliant barrel portion extending away from the first end. The compliant barrel portion has a first inner surface and a first outer surface.

Each circumferential structural panel further comprises a stiffened bulb portion angled with respect to the compliant barrel portion and extending radially away from the compliant barrel portion, and terminating at the second end. The stiffened bulb portion has a second inner surface and a second outer surface, and has a closed stiffened cavity portion integral with a perimeter lip portion.

The load distribution panel system further comprises one or more thrust reverser actuation system (TRAS) actuators coupled to the load distribution panel assembly. The load distribution panel system further comprises one or more clevis members coupled to the second inner surface of the stiffened bulb portion of each circumferential structural panel, to facilitate attachment of the one or more TRAS actuators to the load distribution panel assembly.

The load distribution panel system further comprises an upper beam assembly coupled to an upper end of each panel portion. The load distribution panel system further comprises a lower beam assembly coupled to a lower end of each panel portion.

The load distribution panel assembly converts one or more fore/aft point loads applied to the load distribution panel assembly by the one or more TRAS actuators, to a hoop tension load and a hoop compression load, and reacts a load offset between the one or more TRAS actuators and the load distribution panel assembly, in one or more in-plane loads, to provide a uniform load distribution of the one or more fore/aft point loads, through the load distribution panel assembly, and to the fixed structure.

In another embodiment of the disclosure, there is provided a method for providing a uniform load distribution in a gas turbine engine of a vehicle. The method comprises the step of installing in the gas turbine engine a load distribution panel system comprising a load distribution panel assembly, and one or more load applying apparatuses coupled to the load distribution panel assembly.

The load distribution panel assembly comprises a panel structure having at least one panel portion comprising a circumferential structural panel. The circumferential structural panel comprises a first end and a second end. The circumferential structural panel further comprises a first compliant portion extending away from the first end. The first compliant portion has a first inner surface and a first outer surface.

The circumferential structural panel further comprises a second stiffened portion angled with respect to the first compliant portion and extending radially away from the first compliant portion, and terminating at the second end. The second stiffened portion has a second inner surface and a second outer surface, and has a closed stiffened cavity portion integral with a perimeter lip portion.

The method further comprises the step of coupling the first end of the load distribution panel assembly to a fixed structure of the gas turbine engine. The method further comprises the step of applying, with the one or more load applying apparatuses, one or more fore/aft point loads to the load distribution panel assembly.

The method further comprises the step of using the load distribution panel assembly to convert the one or more fore/aft point loads applied to the load distribution panel assembly, to a hoop tension load and a hoop compression load, and to react a load offset between the one or more load applying apparatuses and the load distribution panel assembly, in one or more in-plane loads. This provides the uniform load distribution of the one or more fore/aft point loads, through the load distribution panel assembly, and to the fixed structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7 is an illustration of a functional block diagram showing an exemplary embodiment of a load distribution panel system the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
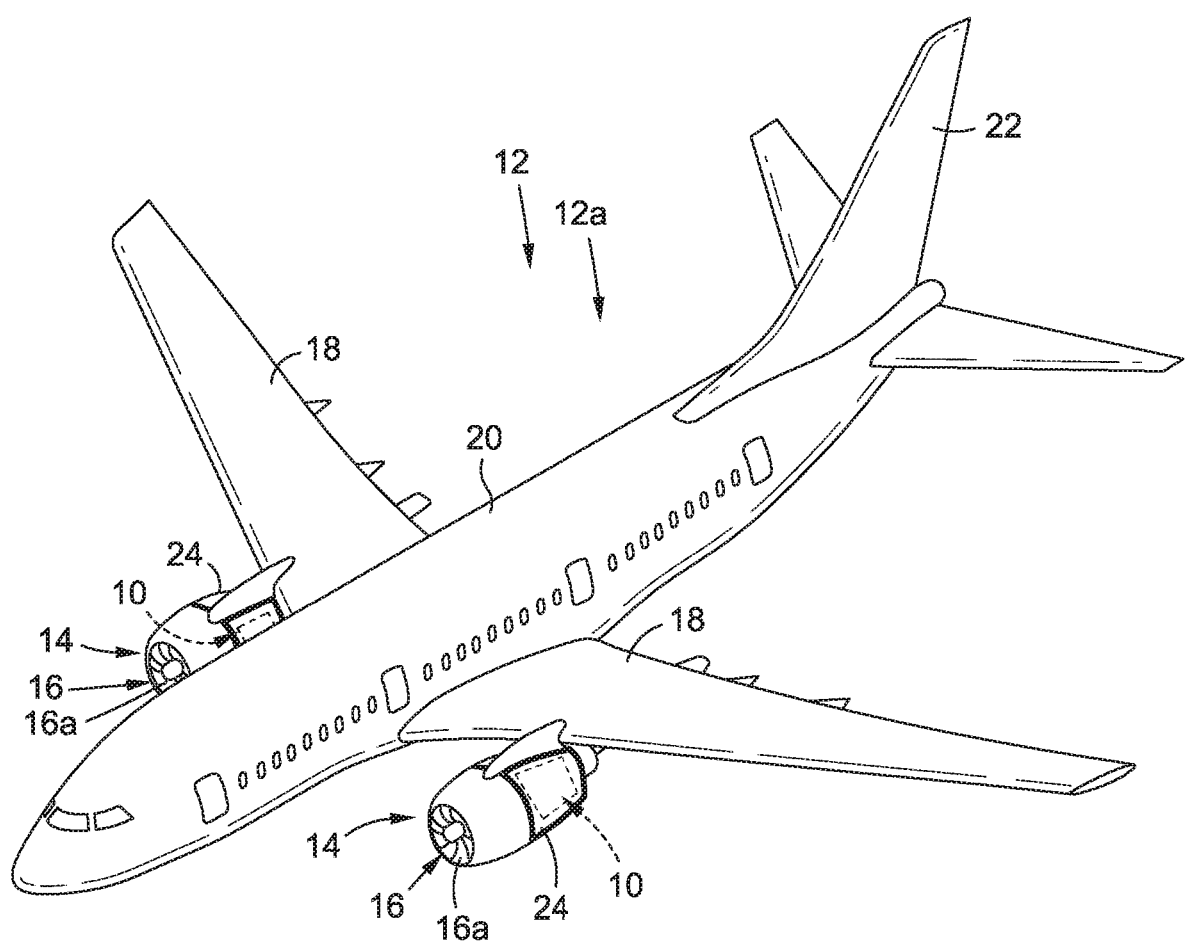
FIG. 1 is an illustration of a perspective view of an air vehicle that incorporates an exemplary embodiment of a load distribution panel system of the disclosure.

Now referring to the Figures, FIG. 1 is an illustration of a perspective view of a vehicle 12, such as in the form of aircraft 12a, that incorporates an exemplary embodiment of a load distribution panel system 10 of the disclosure. As shown in FIG. 1, the vehicle 12, such as in the form of aircraft 12a, comprises nacelles 14 which shroud engines 16, such as gas turbine engines 16a. The vehicle 12, such as in the form of aircraft 12a, further comprises wings 18, a fuselage 20, and a tail 22. As shown in FIG. 1, each nacelle 14 comprises a thrust reverser cowl 24. The thrust reverser cowl 24 (see FIGS. 1, 2A) is part of a thrust reverser assembly 26 (see FIG. 2A).

Figure 2A:
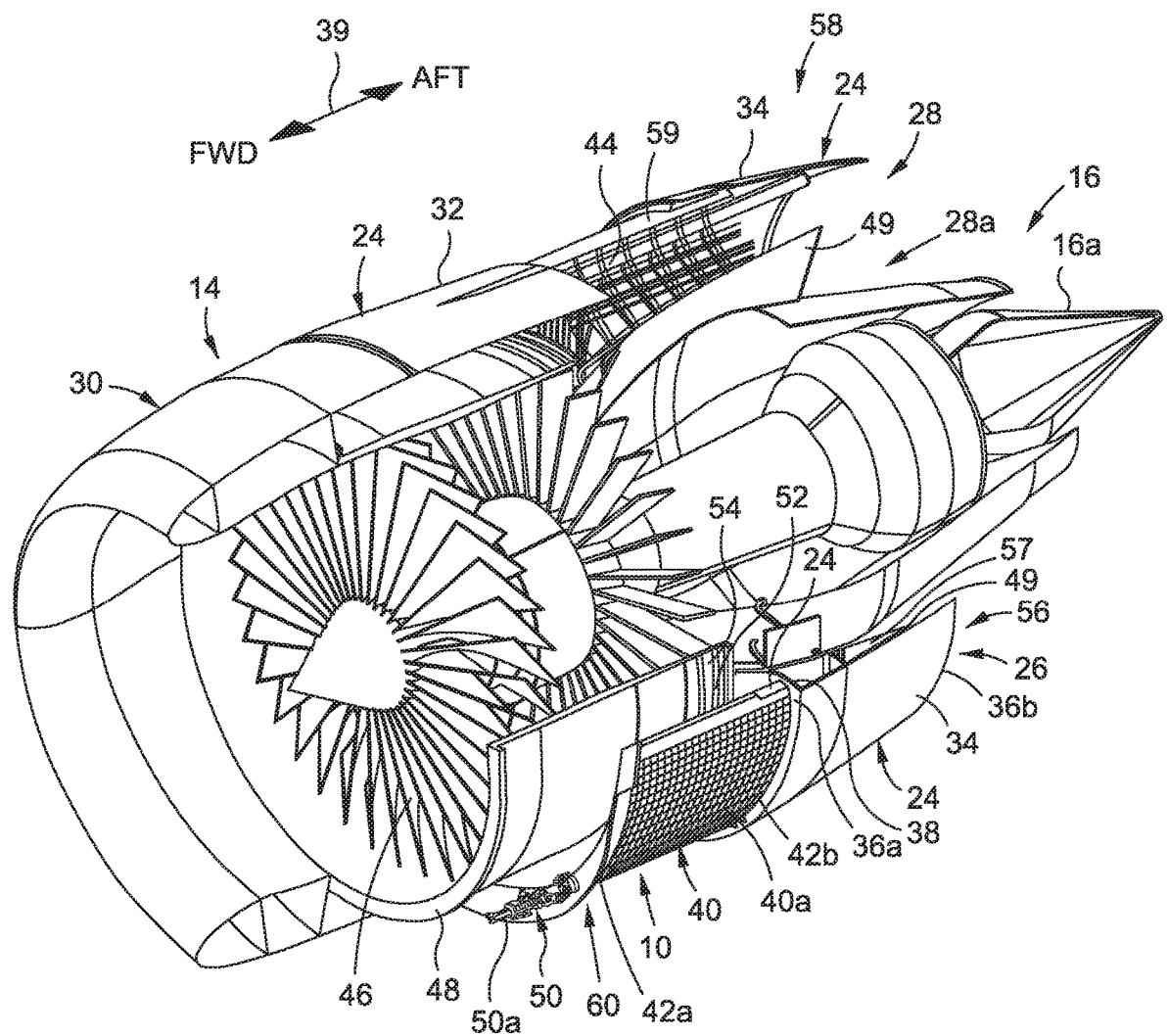
FIG. 2A is an illustration of an isometric side cutaway view of one of the embodiments of an engine assembly incorporating an embodiment of a load distribution panel system and a load distribution panel assembly of the disclosure.
Figure 3A:
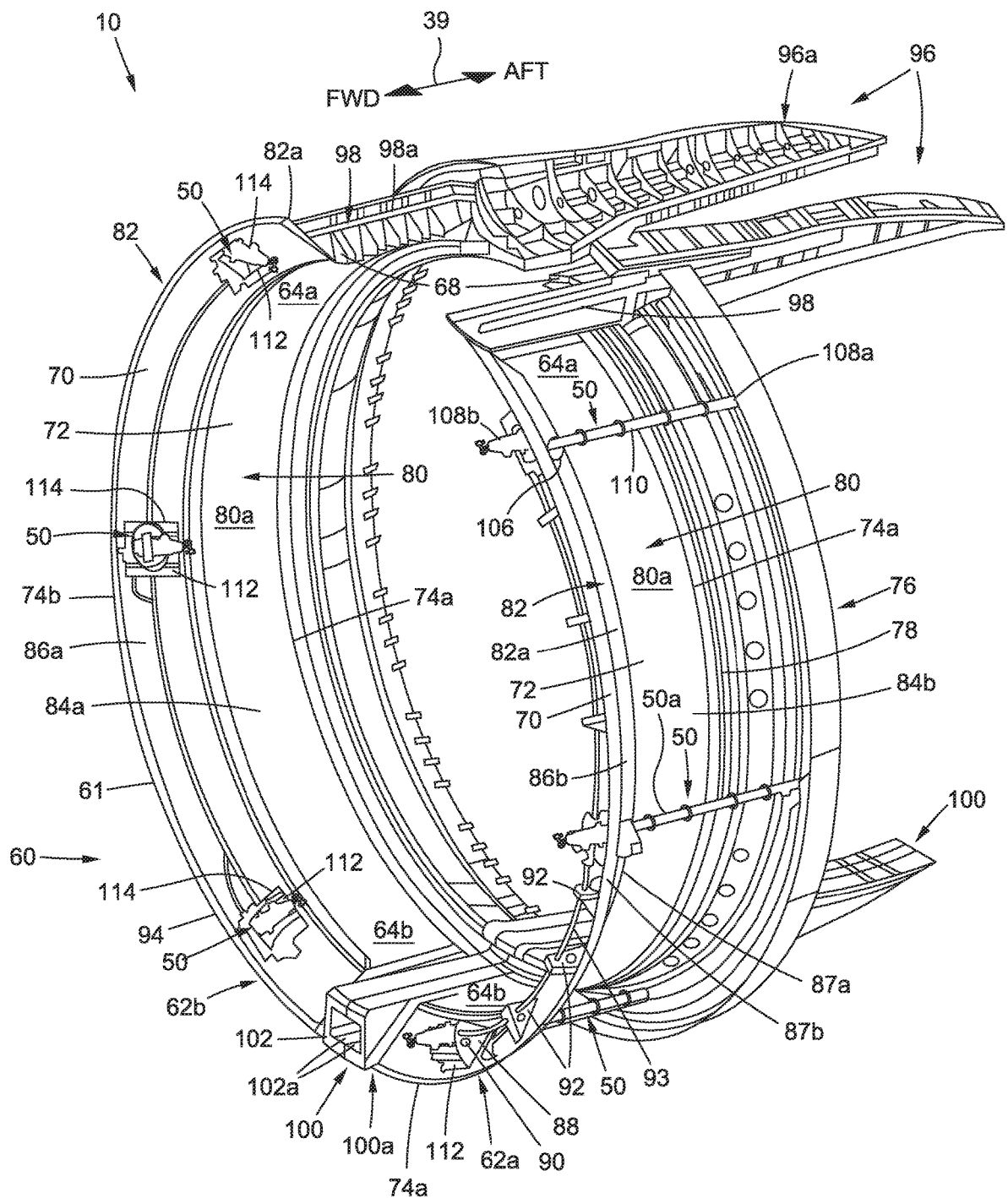
FIG. 3A is an illustration of a perspective view of an exemplary embodiment of a load distribution panel assembly of the load distribution panel system of the disclosure.

Disclosed herewith are exemplary embodiments of novel designs of the load distribution panel system 10 (see FIGS. 3A, 7). The load distribution panel system 10 may be used with a thrust reverser assembly 26 (see FIG. 2A) of an engine assembly 28 (see FIG. 2A), such as in the form of an aircraft engine assembly 28a (see FIG. 2A). The load distribution panel system 10 (see FIG. 7) having a load distribution panel assembly 60 (see FIG. 7) is designed or configured to provide a uniform load distribution 156 (see FIG. 7) in a structure, such as a conical structure, a cylindrical structure, an axisymmetric structure (i.e., having symmetry about an axis), a circular or circumferential structure, or another suitably shaped structure, in a vehicle 12 (see FIG. 7, such as an aircraft 12a (see FIGS. 1, 7), an automobile 12b (see FIG. 7), a watercraft 12c (see FIG. 7) such as a submarine 12d (see FIG. 7), or another suitable vehicle 12. The load distribution panel system 10 (see FIG. 7) having the load distribution panel assembly 60 (see FIG. 7) may also be used in other structures where it is desired that fore/aft point loads 142 (see FIGS. 6A-6B, 7) with a load offset 146 (see FIG. 6A) be converted and distributed as uniform or continuous loads in a structure with a conical shape 72 (see FIG. 7), a cylindrical shape, an axisymmetric shape, a circular or circumferential shape, or another suitable shape.

Now referring to FIG. 2A, FIG. 2A is an illustration of an isometric side cutaway view of one of the embodiments of an engine assembly 28 incorporating an embodiment of the load distribution panel system 10 and load distribution panel assembly 60 of the disclosure. In an embodiment of the disclosure, there is provided the load distribution panel system 10 (see FIG. 2A) having the load distribution panel assembly 60 that is incorporated in the engine assembly 28 (see FIG. 2A) having the thrust reverser assembly 26 (see FIG. 2A). FIG. 2A shows the nacelle 14 which shrouds the engine assembly 28, such as in the form of the aircraft engine assembly 28a. The engine assembly 28 (see FIG. 2A) comprises an engine 16 (see FIG. 2A), such as a gas turbine engine 16a (see FIG. 2A). The nacelle 14 (see FIG. 2A) comprises the thrust reverser cowl 24 (see FIG. 2A) and an inlet cowl 30 (see FIG. 2A). The thrust reverser cowl 24 (see FIG. 2A) is part of the thrust reverser assembly 26 (see FIG. 2A).

The thrust reverser cowl 24 (see FIG. 2A) comprises a fixed member 32 (see FIG. 2A) and a translating sleeve 34 (see FIG. 2A). The translating sleeve 34 (see FIG. 2A) comprises a first end 36a (see FIG. 2A) and a second end 36b (see FIG. 2A). The first end 36a (see FIG. 2A) terminates at an engine portion 38. A forward-aft direction arrow 39 (see FIG. 2A) indicates that the fixed member 32 (see FIG. 2A) is forward of the translating sleeve 34 (see FIG. 2A), and the translating sleeve 34 (see FIG. 2A) is aft of the fixed member 32 (see FIG. 2A).

As shown in FIG. 2A, the thrust reverser assembly 26 further comprises a plurality of cascade members 40, such as in the form of translating cascade baskets 40a. The plurality of cascade members 40 (see FIG. 2A) has a first end 42a (see FIG. 2A) and a second end 42b (see FIG. 2A). The second end 42b (see FIG. 2A) of the plurality of cascade members 40 (see FIG. 2A) is attached to the translating sleeve 34 (see FIG. 2A). The plurality of cascade members 40 are also preferably mounted to the engine portion 38 and translate aft with the translating sleeve 34 of the thrust reverser cowl 24. As further shown in FIG. 2A, one or more sliding tracks 44 may guide the forward-aft movement of the thrust reverser assembly 26, including the translating sleeve 34.

As further shown in FIG. 2A, the engine assembly 28 further comprises a fan 46, an engine fan case 48 around the fan 46, and a fan duct 49. As further shown in FIG. 2A, the thrust reverser assembly 26 further comprises one or more load applying apparatuses 50, such as in the form of one or more thrust reverser actuation system (TRAS) actuators 50a. The thrust reverser assembly 26 (see FIG. 2A) further comprises an outer blade fitting 52 (see FIG. 2A) coupled to the thrust reverser cowl 24 (see FIG. 2A). The outer blade fitting 52 (see FIG. 2A) is configured to be received in a mating outer groove fitting 54 (see FIG. 2A) formed in the fan case 48 (see FIG. 2A). The outer groove fitting 54 (see FIG. 2A) and the outer blade fitting 52 (see FIG. 2A) act to couple the engine fan case 48 (see FIG. 2A) and the thrust reverser cowl 24 (see FIG. 2A) together and transfer loads between the engine fan case 48 (see FIG. 2A) and the thrust reverser cowl 24 (see FIG. 2A).

FIG. 2A shows the thrust reverser cowl 24 in a stowed position 56 at a first portion 57 of the engine assembly 28. The stowed position 56 (see FIG. 2A) may occur, for example, in a flight condition for the aircraft 12a (see FIG. 1). FIG. 2A further shows the thrust reverser cowl 24 in a deployed position 58 at a second portion 59 of the engine assembly 28. The deployed position 58 (see FIG. 2A) may occur, for example, during or after a landing condition for the aircraft 12a (see FIG. 1). As further shown in FIG. 2A, the load distribution panel system 10 comprises a load distribution panel assembly 60.

Figure 2B:
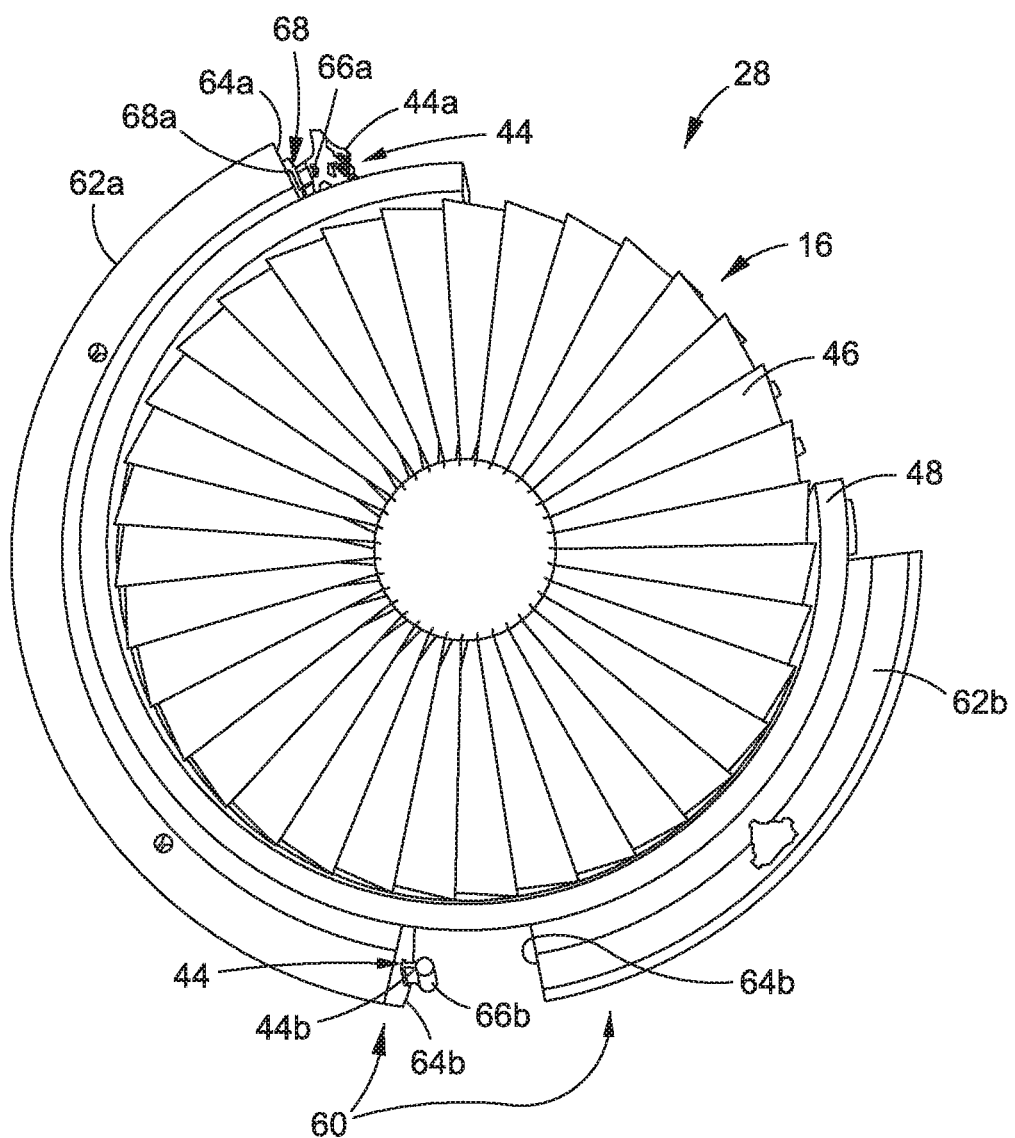
FIG. 2B is an illustration of a front cutaway view of the engine assembly and the load distribution panel assembly of FIG. 2A with the nacelle removed.

Now referring to FIG. 2B, FIG. 2B is an illustration of a front cutaway view of the engine assembly 28 and the load distribution panel assembly 60 of FIG. 2A with the nacelle 14 (see FIG. 2A) removed. FIG. 2B shows the fan 46 of the engine 16 surrounded by the engine fan case 48. Panel portions 62a, 62b (see FIG. 2B) of the load distribution panel assembly 60 (see FIG. 2B) surround the engine fan case 48 (see FIG. 2B). The panel portions 62a, 62b (see FIG. 2B) each have an upper end 64a (see FIG. 2B) and a lower end 64b (see FIG. 2B). A sliding track 44, such as in the form of first sliding track 44a, and a first translating portion 66a of the first sliding track 44a are shown at the upper end 64a of the panel portion 62a. A sliding track 44, such as in the form of second sliding track 44b, and a second translating portion 66b of the second sliding track 44b are shown at the lower end 64b of the panel portion 62a. As further shown in FIG. 2B, a lower element 68, such as in the form of a hinge element 68a, is attached to the upper end 64a of the panel portion 62a.

Now referring to FIG. 3A, FIG. 3A is an illustration of a perspective view of an exemplary embodiment of the load distribution panel assembly 60 of the load distribution panel system 10 (see FIGS. 2A, 7) of the disclosure. As shown in FIG. 3A, the load distribution panel assembly 60 comprises a panel structure 61. The panel structure 61 preferably comprises at least one panel portion 62a (see FIGS. 3A, 5A) comprising at least one circumferential structural panel 70 (see FIG. 3A) or at least one circumferential structural panel 70a (see FIG. 5A). The panel structure 61 (see FIG. 3A) may comprise two panel portions 62a, 62b (see FIG. 3A), such as two circumferential structural panels 70 (see FIG. 3A) or two circumferential structural panels 70a (see FIG. 5A), or may comprise more than two panel portions. As shown in FIG. 3A, each of the panel portions 62a, 62b have the upper end 64a and the lower end 64b, respectively. Each panel portion 62a, 62b (see FIG. 3A) may be in the form of a circumferential or curved bracket structure or another suitably shaped structure. The panel structure 61 (see FIGS. 3A, 7) may comprise a single unitary or monolithic structure comprising a single panel portion 62a, or may comprise two or more separate panel portions 62a, 62b that may be coupled or joined together.

As further shown in FIG. 3A, the two panel portions 62a, 62b preferably form a hoop configuration 94 when coupled together as the panel structure 61. The two panel portions 62a, 62b (see FIG. 3A) are preferably coupled together at respective upper ends 64a (see FIG. 3A) via an upper beam assembly 96 (see FIG. 3A), such as in the form of a hinge beam assembly 96a (see FIG. 3A), and are preferably coupled together at respective lower ends 64b via a lower beam assembly 100 (see FIG. 3A), such as in the form of a latch beam assembly 100a (see FIG. 3A).

The load distribution panel assembly 60 (see FIG. 3A) provides a uniform load distribution 156 (see FIG. 7) in the vehicle 12 (see FIGS. 1, 7), such as in a gas turbine engine 16a (see FIGS. 2A, 7) in the vehicle 12. As shown in FIG. 3A, each panel portion 62a, 62b comprises the circumferential structural panel 70, preferably having a conical shape 72. As shown in FIG. 3A, each circumferential structural panel 70 of the load distribution panel assembly 60 comprises a first end 74a and a second end 74b, where the first end 74a is coupled to a fixed structure 76, such as a translating sleeve bulkhead 78, or such as the outer blade fitting 52 (see FIG. 2A) or another suitable fixed structure 76.

As shown in FIG. 3A, each circumferential structural panel 70 of the load distribution panel assembly 60 further comprises a first compliant portion 80, such as in the form of a compliant barrel portion 80a, that extends away from the first end 74a. The first compliant portion 80 (see FIGS. 3A, 5A, 7) may extend axially (parallel to the axis of a load applying apparatus 50 (see FIG. 3A)) away from the first end 74a, may extend radially away from the first end 74a, or may extend both axially and radially away from the first end 74a. The first compliant portion 80 (see FIG. 3A) has a first inner surface 84a (see FIG. 3A) and a first outer surface 84b (see FIG. 3A).

As shown in FIG. 3A, each circumferential structural panel 70 of the load distribution panel assembly 60 further comprises a second stiffened portion 82, such as in the form of stiffened bulb portion 82a, angled with respect to the first compliant portion 80 and extending radially away from the first compliant portion 80, and terminating at the second end 74b. The second stiffened portion 82 (see FIG. 3A), such as in the form of stiffened bulb portion 82a (see FIG. 3A), has a second inner surface 86a (see FIG. 3A) and a second outer surface 86b (see FIG. 3A), and has a closed stiffened cavity portion 87a (see FIG. 3A) integral with a perimeter lip portion 87b (see FIG. 3A).

The first compliant portion 80, such as in the form of a compliant barrel portion 80a, and the second stiffened portion 82, such as in the form of stiffened bulb portion 82a, of the circumferential structural panel 70 may comprise a single monolithic or unitary structure, or alternatively, may comprise separate portions that may be joined or coupled together with attachment elements such as bolts, pins, or other suitable attachment elements.

As shown in FIG. 3A, the load distribution panel system 10 may further comprise one or more clevis members 88 coupled to the second inner surface 86a of the second stiffened portion 82 of each circumferential structural panel 70, to facilitate attachment of the one or more load applying apparatuses 50, such as in the form of one or more thrust reverser actuation system (TRAS) actuators 50a. The clevis member 88 comprises one or more attachment holes 90 engageable to a tie rod (not shown) or another suitable attachment means.

As shown in FIG. 3A, each load applying apparatus 50, such as in the form of TRAS actuator 50a, has a first end 108a attached to a translating sleeve 34 of a thrust reverser assembly 26, has a second end 108b attached to the closed stiffened cavity portion 87a of the second stiffened portion 82, and has a rod body 110 between the first end 108a and the second end 108b. The forward-aft direction arrow 39 (see FIG. 3A) indicates that the second end 108b (see FIG. 3A) of each TRAS actuator 50a (see FIG. 3A) is forward of the first end 108a (see FIG. 3A), and that the first end 108a (see FIG. 3A) is aft of the second end 108b (see FIG. 3A).

As further shown in FIG. 3A, each load applying apparatus 50, such as in the form of TRAS actuator 50a, may be inserted through an attachment opening 106 and attached via one or more thrust reverser actuation system (TRAS) attach fittings 112 at locations 114 on the second inner surface 86a of the second stiffened portion 82. As shown in FIG. 3A, the load distribution panel system 10 may further comprise one or more support elements 92 and one or more power connectors 93, such as hydraulic power connectors, electrical power connectors, pneumatic power connectors, or another suitable power connector, to facilitate attachment and/or support of and power to the one or more load applying apparatuses 50, such as in the form of one or more thrust reverser actuation system (TRAS) actuators 50a.

As further shown in FIG. 3A, the load distribution panel system 10 may further comprise an upper beam assembly 96 coupled to an upper end 64a of each panel portion 62a, 62b. As shown in FIG. 3A, the upper beam assembly 96, such as in the form of hinge beam assembly 96a, may comprise one or more upper elements 68a, one or more upper beams 98, such as in the form of hinge beams 98a, and the first sliding track 44a (see FIG. 2B). As further shown in FIG. 3A, the load distribution panel system 10 may further comprise a lower beam assembly 100, such as in the form of latch beam assembly 100a, coupled to a lower end 64b of each panel portion 62a, 62b. As shown in FIG. 3A, the lower beam assembly 100 may comprise one or more lower elements 102, such as in the form of one or more latch elements 102a, and the second sliding track 44b (see FIG. 2B).

Figure 3B:
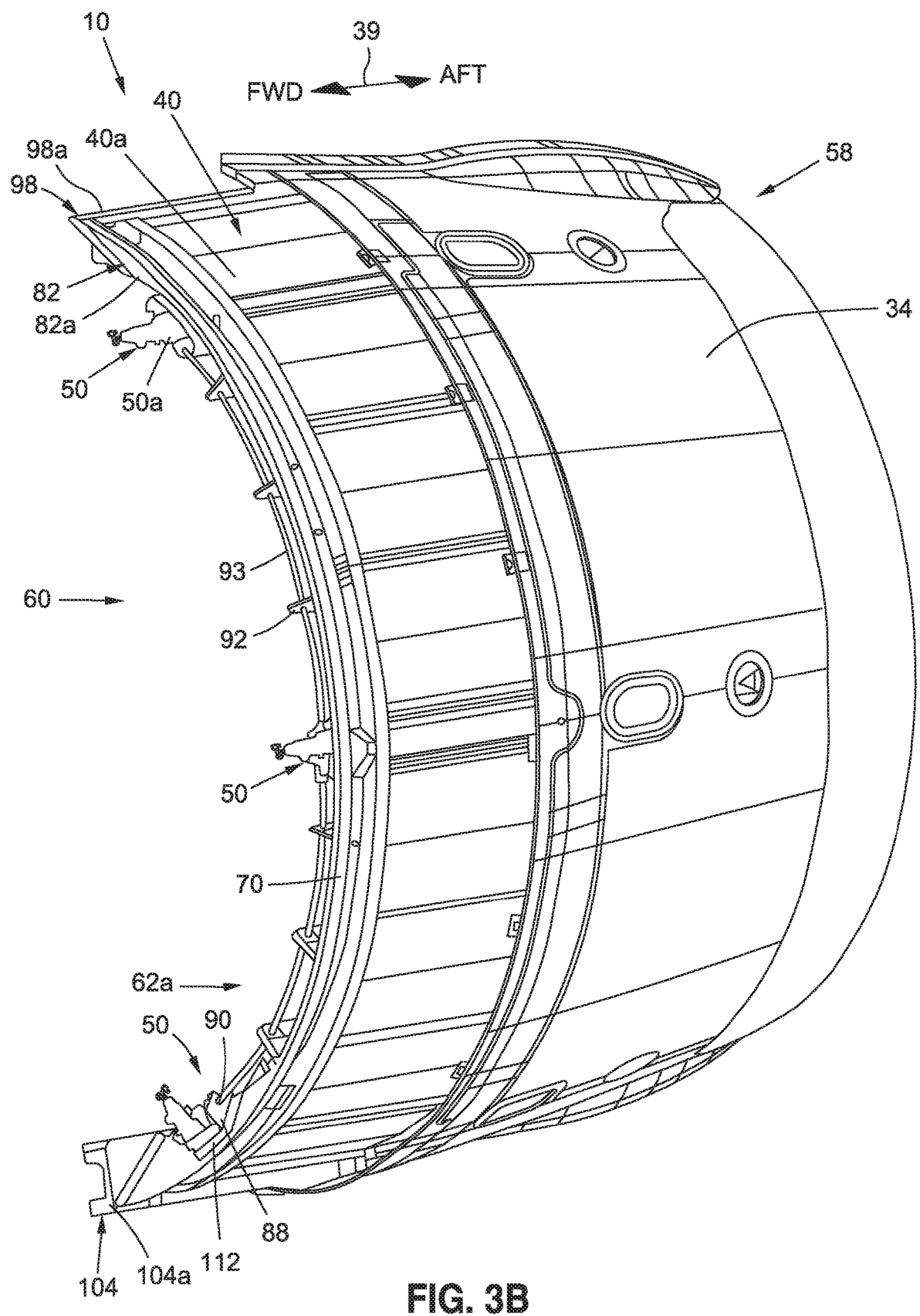
FIG. 3B is an illustration of a perspective view of the panel portion of the load distribution panel assembly and the load distribution panel system of FIG. 3A with the plurality of cascade members and the translating sleeve.

Now referring to FIG. 3B, FIG. 3B is an illustration of a perspective view of the panel portion 62b of the load distribution panel system 10 and the load distribution panel assembly 60 of FIG. 3A, with the plurality of cascade members 40, such as in the form of translating cascade baskets 40a, and the translating sleeve 34. As shown in FIG. 3B, the translating sleeve 34 is in the deployed position 58 to expose the plurality of cascade members 40. A forward-aft direction arrow 39 (see FIG. 3B) indicates that the circumferential structural panel 70 (see FIG. 3B) and the plurality of cascade members 40 (see FIG. 3B) are forward of the translating sleeve 34 (see FIG. 3B), and that the translating sleeve (see FIG. 3B) is aft of the circumferential structural panel 70 (see FIG. 3B) and the plurality of cascade members 40 (see FIG. 3B).

FIG. 3B further shows the second stiffened portion 82, such as in the form of stiffened bulb portion 82a, the load applying apparatuses 50, such as in the form of TRAS actuators 50a, the clevis member 88 with attachment opening 90, the support element 92, the power connector, the TRAS attach fitting 112, the upper beam 98, and the lower beam 104.

Figure 3C:
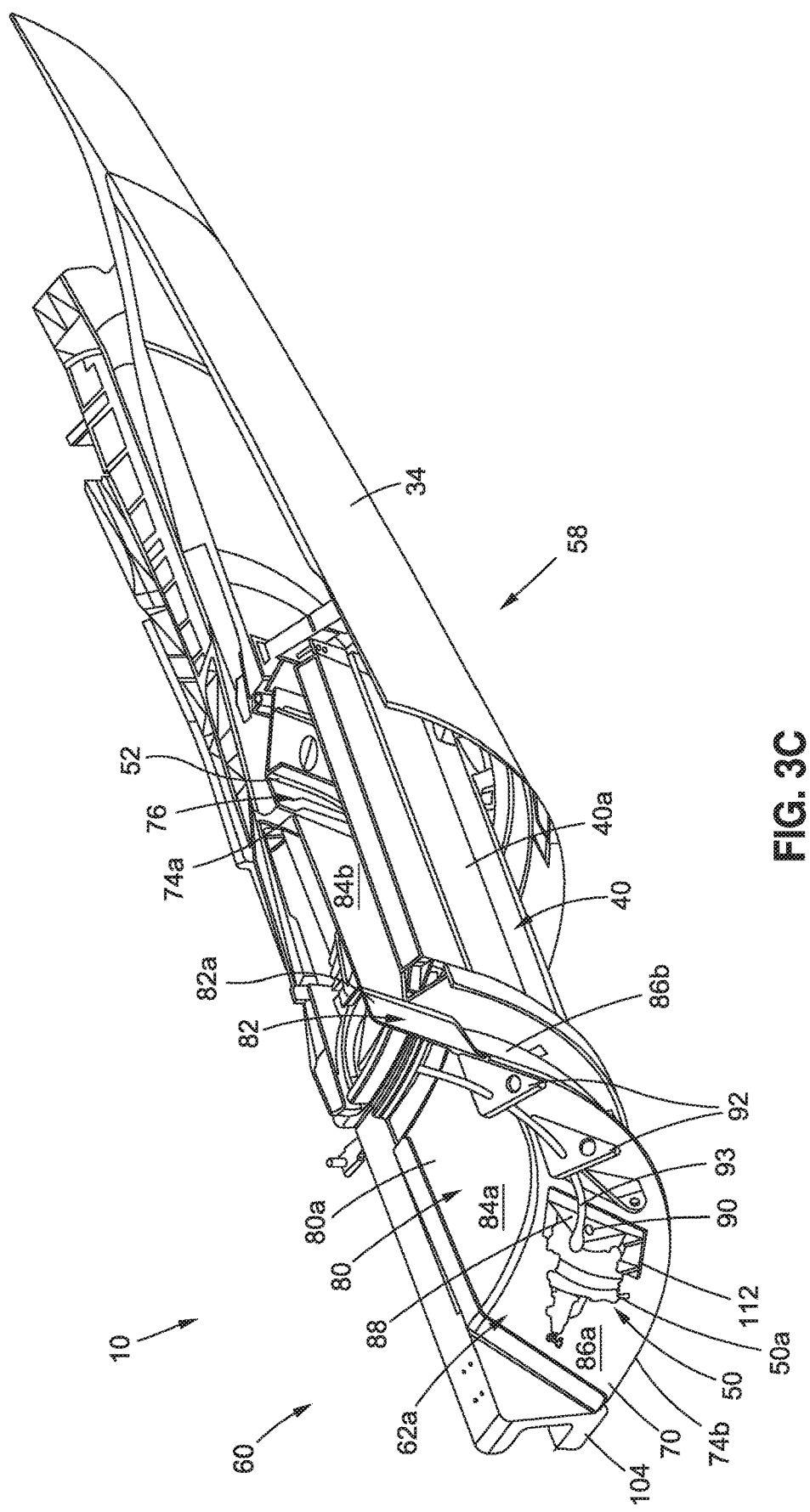
FIG. 3C is an illustration of a perspective cutaway view of a partial portion of the panel portion of the load distribution panel assembly and load distribution panel system of FIG. 3A with the plurality of cascade members and the translating sleeve.

Now referring to FIG. 3C, FIG. 3C is an illustration of a perspective cutaway view of a partial portion of the panel portion 62b of the load distribution panel system 10 and the load distribution panel assembly 60 of FIG. 3A, with the plurality of cascade members 40, such as in the form of translating cascade baskets 40a, and the translating sleeve 34. As shown in FIG. 3C, the translating sleeve 34 is in the stowed position 58, and the load distribution panel assembly 60 has the first end 74a coupled to the fixed structure 76, such as the outer blade fitting 52, and has the second end 74b.

The circumferential structural panel 70 (see FIG. 3C) includes the first compliant portion 80 (see FIG. 3C), such as in the form of compliant barrel portion 80a (see FIG. 3C), having the first inner surface 84a (see FIG. 3C) and the first outer surface 84b (see FIG. 3C). The circumferential structural panel 70 (see FIG. 3C) further includes the second stiffened portion 82 (see FIG. 3C), such as in the form of stiffened bulb portion 82a (see FIG. 3C), having the second inner surface 86a (see FIG. 3C) and the second outer surface 86b (see FIG. 3C).

FIG. 3C further shows the load applying apparatus 50, such as in the form of TRAS actuator 50a, the clevis member 88 with attachment opening 90, the support elements 92, the power connectors 93, the TRAS attach fitting 112, and the latch beam 104.

Figure 3D:
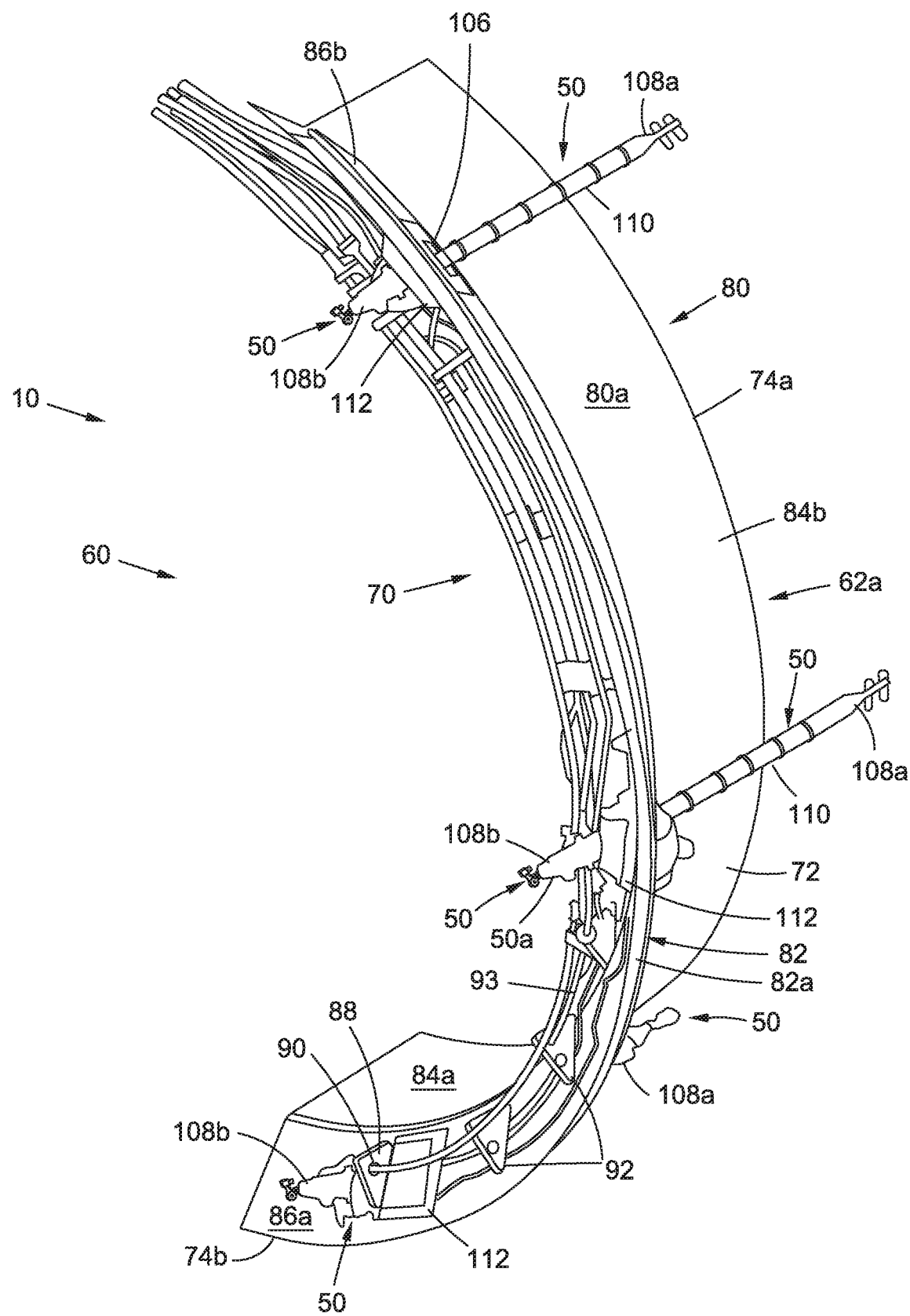
FIG. 3D is an illustration of a perspective view of the panel portion of the load distribution panel assembly of FIG. 3A showing a circumferential structural panel with a plurality of TRAS actuators.

Now referring to FIG. 3D, FIG. 3D is an illustration of a perspective view of the panel portion 62b, with the conical shape 72, of load distribution panel assembly 60 of FIG. 3A, showing the circumferential structural panel 70 with a plurality of load applying apparatuses 50, such as in the form of TRAS actuators 50a. As shown in FIG. 3D, each load applying apparatus 50, such as in the form of TRAS actuator 50a, has a first end 108a, a second end 108b, and a rod body 110, and is attached through attachment opening 106 and is attached to the panel portion 62b via the TRAS attach fitting 112.

The circumferential structural panel 70 (see FIG. 3D) includes the first compliant portion 80 (see FIG. 3D), such as in the form of compliant barrel portion 80a (see FIG. 3D), having the first inner surface 84a (see FIG. 3D) and the first outer surface 84b (see FIG. 3D). The circumferential structural panel 70 (see FIG. 3D) further includes the second stiffened portion 82 (see FIG. 3D), such as in the form of stiffened bulb portion 82a (see FIG. 3D), having the second inner surface 86a (see FIG. 3D) and the second outer surface 86b (see FIG. 3D). FIG. 3D further shows the first end 74a, the second end 74b, the clevis member 88 with attachment opening 90, and the support elements 92 and the power connector 93.

Figure 4A:
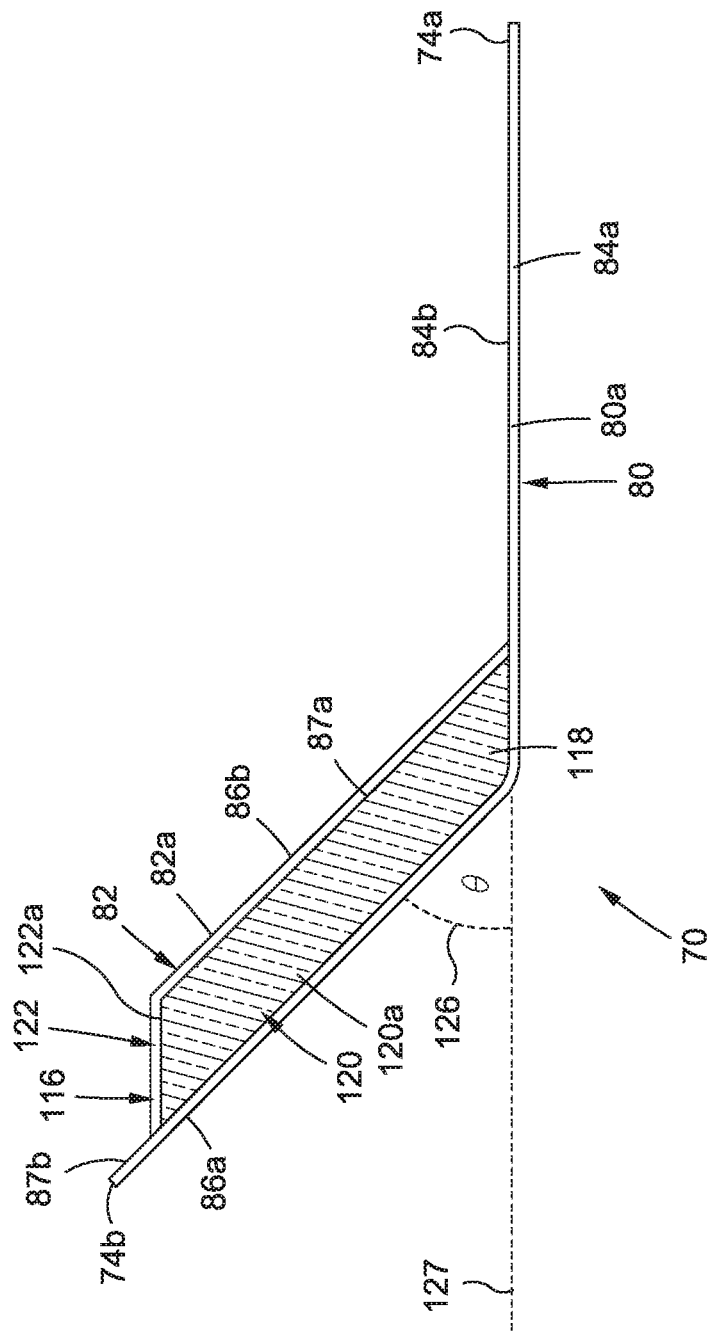
FIG. 4A is an illustration of a cross-sectional side view of an exemplary embodiment of a circumferential structural panel used in the load distribution panel system of the disclosure.

Now referring to FIG. 4A, FIG. 4A is an illustration of a cross-sectional side view of an exemplary embodiment of a circumferential structural panel 70 used in the load distribution panel system 10 (see FIGS. 3A, 7) of the disclosure. As shown in FIG. 4A, the circumferential structural panel 70 has the first end 74a and the second end 74b, and comprises the first compliant portion 80, such as in the form of compliant barrel portion 80a, having the first inner surface 84a and the first outer surface 84b. As further shown in FIG. 4A, the circumferential structural panel 70 further comprises the second stiffened portion 82, such as in the form of stiffened bulb portion 82a, having the second inner surface 86a and the second outer surface 86b, and having the closed stiffened cavity portion 87a and the perimeter lip portion 87b.

As further shown in FIG. 4A, the closed stiffened cavity portion 87a has a sandwich structure 116 with a core interior 118 filled with a stiffened material 120 comprising a honeycomb core 120a. Alternatively, the core interior 118 may be filled with a stiffened material 120 in the form of a foam core 120b (see FIG. 5B) or another suitable stiffened material, or the core interior may be a hollow core interior 118b (see FIG. 7). The closed stiffened cavity portion 87a (see FIG. 4A) has a geometric configuration 122 comprising a parallelogram 122a. However, the closed stiffened cavity portion 87a may have another suitable geometric configuration 122, such as a trapezoid 122b (see FIG. 5B), a rectangle 122c (see FIG. 7), an ellipse 122d (see FIG. 7), or another suitable geometric configuration 122.

As further shown in FIG. 4A, the second stiffened portion 82, such as in the form of stiffened bulb portion 82a, is angled or bent upwardly from an x-axis 127 with respect to the first compliant portion 80, such as in the form of compliant barrel portion 80a, to form an angle 126 (theta θ). The second stiffened portion 82, such as in the form of stiffened bulb portion 82a, is angled with respect to the first compliant portion 80 at the angle 126, preferably, in a range between 25° (twenty-five degrees) and 80° (eighty degrees); and more preferably angled at an angle 126 in a range between 45° (forty-five degrees) and 60° (sixty degrees). The most optimal angle (theta θ) will be a function of the stiffness of the materials that make up the constituent components, such as the first compliant portion 80 (see FIG. 7) and second stiffened portion 82 (see FIG. 7). The second stiffened portion 82, such as in the form of stiffened bulb portion 82a, creates a reinforced torque capable section 128 that allows the compliant barrel section 80a to function as a spring.

Figure 4B:
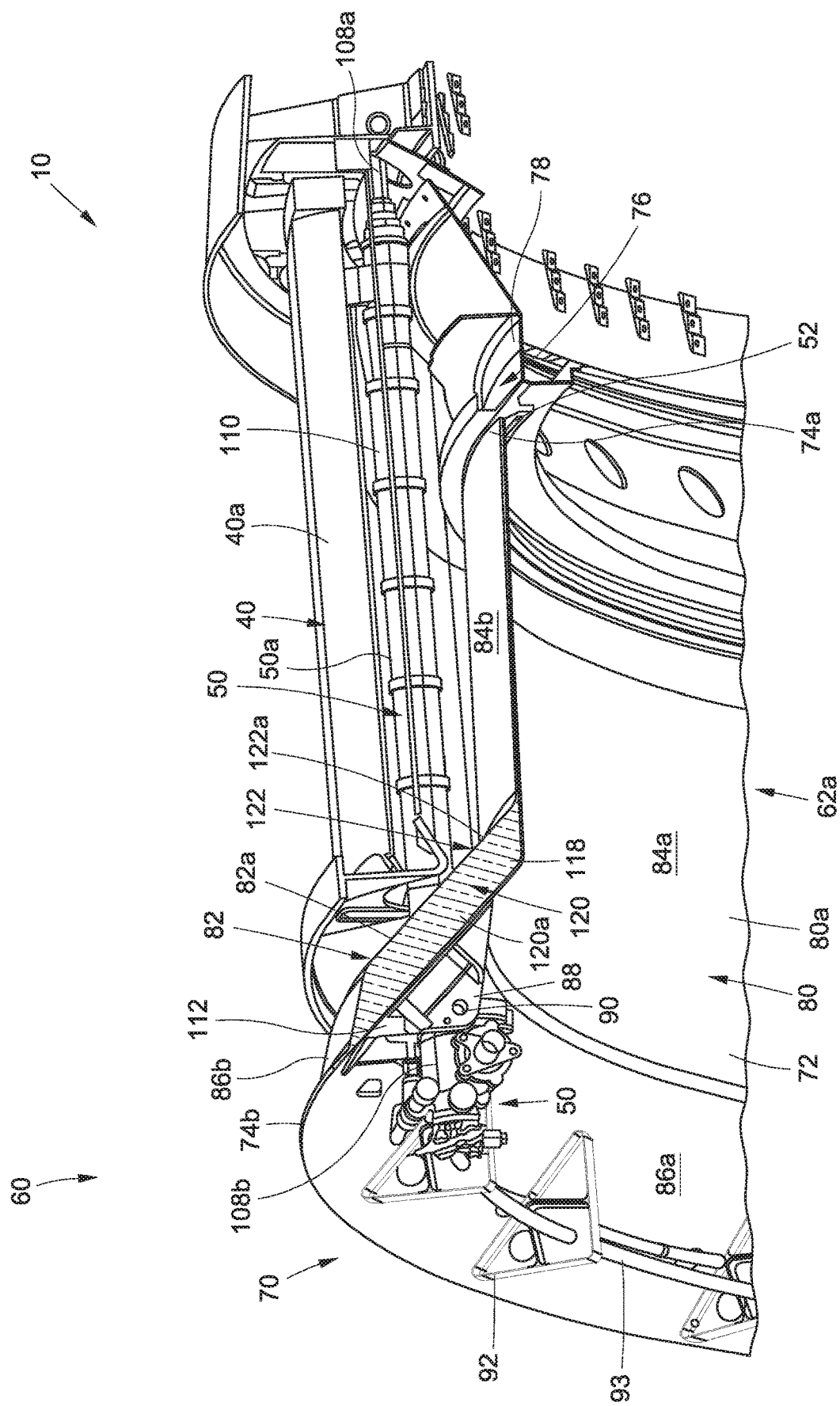
FIG. 4B is an illustration of an enlarged perspective side view of an exemplary embodiment of the load distribution panel system of the disclosure that incorporates the circumferential structural panel of FIG. 4A.

Now referring to FIG. 4B, FIG. 4B is an illustration of an enlarged perspective side view of an exemplary embodiment of the load distribution panel system 10 of the disclosure that incorporates the load distribution panel assembly 60 comprising the circumferential structural panel 70 of FIG. 4A.

As shown in FIG. 4B, the panel portion 62a, with the conical shape 72, of load distribution panel assembly 60 shows the circumferential structural panel 70 with the load applying apparatus 50, such as in the form of TRAS actuator 50a. As shown in FIG. 4B, the load applying apparatus 50, such as in the form of TRAS actuator 50a, has the first end 108a, the second end 108b, and the rod body 110, and is attached to the panel portion 62a via the TRAS attach fitting 112.

The circumferential structural panel 70 (see FIG. 4B) includes the first compliant portion 80 (see FIG. 4B), such as in the form of compliant barrel portion 80a (see FIG. 4B), having the first inner surface 84a (see FIG. 4B) and the first outer surface 84b (see FIG. 4B). The circumferential structural panel 70 (see FIG. 4B) further includes the second stiffened portion 82 (see FIG. 4B), such as in the form of stiffened bulb portion 82a (see FIG. 4B), having the second inner surface 86a (see FIG. 4B) and the second outer surface 86b (see FIG. 4B). As shown in FIG. 4B, the second stiffened portion 82, such as in the form of stiffened bulb portion 82a, has a core interior 118 filled with a stiffened material 120, such as in the form of a honeycomb core 120a, and has a geometric configuration 122, such as in the form of a parallelogram 122a.

FIG. 4B further shows the first end 74a, the second end 74b, the clevis member 88 with attachment opening 90, and the support element 92 and power connector 93. The first end 74a (see FIG. 4B) is attached to the fixed structure 76 (see FIG. 4B), such as in the form of outer blade fitting 52, and the translating sleeve bulkhead 78. FIG. 4B further shows the plurality of cascade members 40, such as in the form of translating cascade baskets 40a.

Figure 5A:
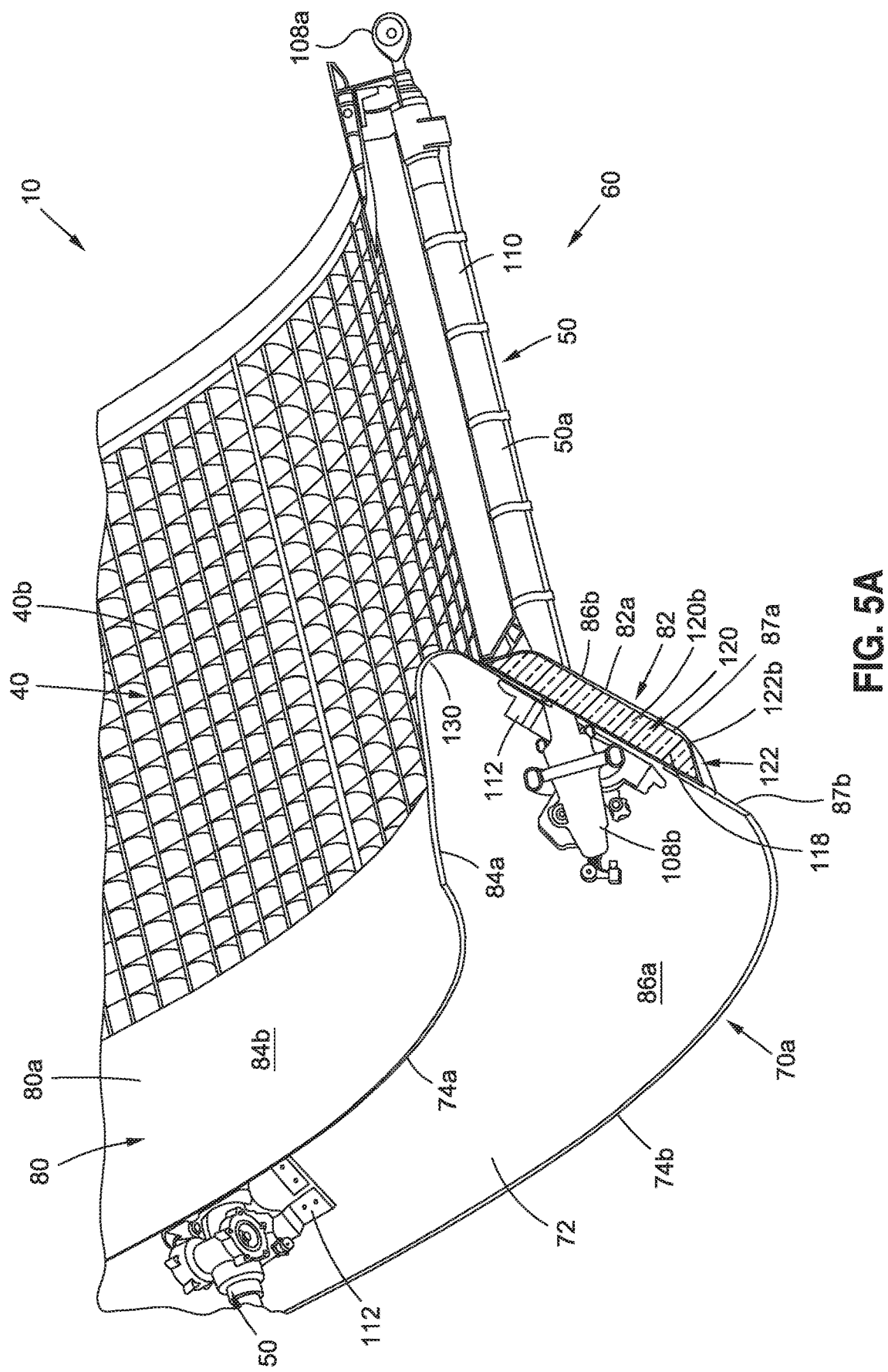
FIG. 5A is an illustration of an enlarged perspective partial side view of an embodiment of a load distribution panel system of the disclosure that incorporates another embodiment of a circumferential structural panel of the disclosure.

Now referring to FIG. 5A, FIG. 5A is an illustration of an enlarged perspective partial side view of an embodiment of a load distribution panel system 10 of the disclosure that incorporates another embodiment of a circumferential structural panel 70a having a conical shape 72, of the disclosure. In this version of the circumferential structural panel 70a, the first end 74a and the second end 74b both curve forward and project outwardly on the same side, as opposed to opposite sides, and the circumferential panel 70a has a curve 130 that causes the first compliant portion 80, such as in the form of compliant barrel portion 80a, to be curved forward in the same general direction as the second stiffened portion 82, such as in the form of stiffened bulb portion 82a.

The circumferential structural panel 70a (see FIG. 5A) includes the first compliant portion 80 (see FIG. 5A), such as in the form of compliant barrel portion 80a (see FIG. 5A), having the first inner surface 84a (see FIG. 5A) and the first outer surface 84b (see FIG. 5A). The circumferential structural panel 70a (see FIG. 5A) further includes the second stiffened portion 82 (see FIG. 5A), such as in the form of stiffened bulb portion 82a (see FIG. 5A), having the second inner surface 86a (see FIG. 5A) and the second outer surface 86b (see FIG. 5A). As shown in FIG. 5A, the second stiffened portion 82, such as in the form of stiffened bulb portion 82a, has a closed stiffened cavity portion 87a, a perimeter lip portion 87b, a core interior 118 filled with a stiffened material 120, such as in the form of a foam core 120b, and has a geometric configuration 122, such as in the form of a trapezoid 122b. Alternatively, the core interior 118 may be filled with a stiffened material 120 in the form of a honeycomb core 120a (see FIG. 7) or another suitable stiffened material, or the core interior may be a hollow core interior 118b (see FIG. 7).

FIG. 5A further shows the load applying apparatus 50, such as in the form of TRAS actuator 50a, having the first end 108a, the second end 108b, and the rod body 110, and is attached to the load distribution panel assembly 60 via the TRAS attach fitting 112. FIG. 5A further shows the plurality of cascade members 40, such as in the form of fixed cascade baskets 40b.

Figure 5B:
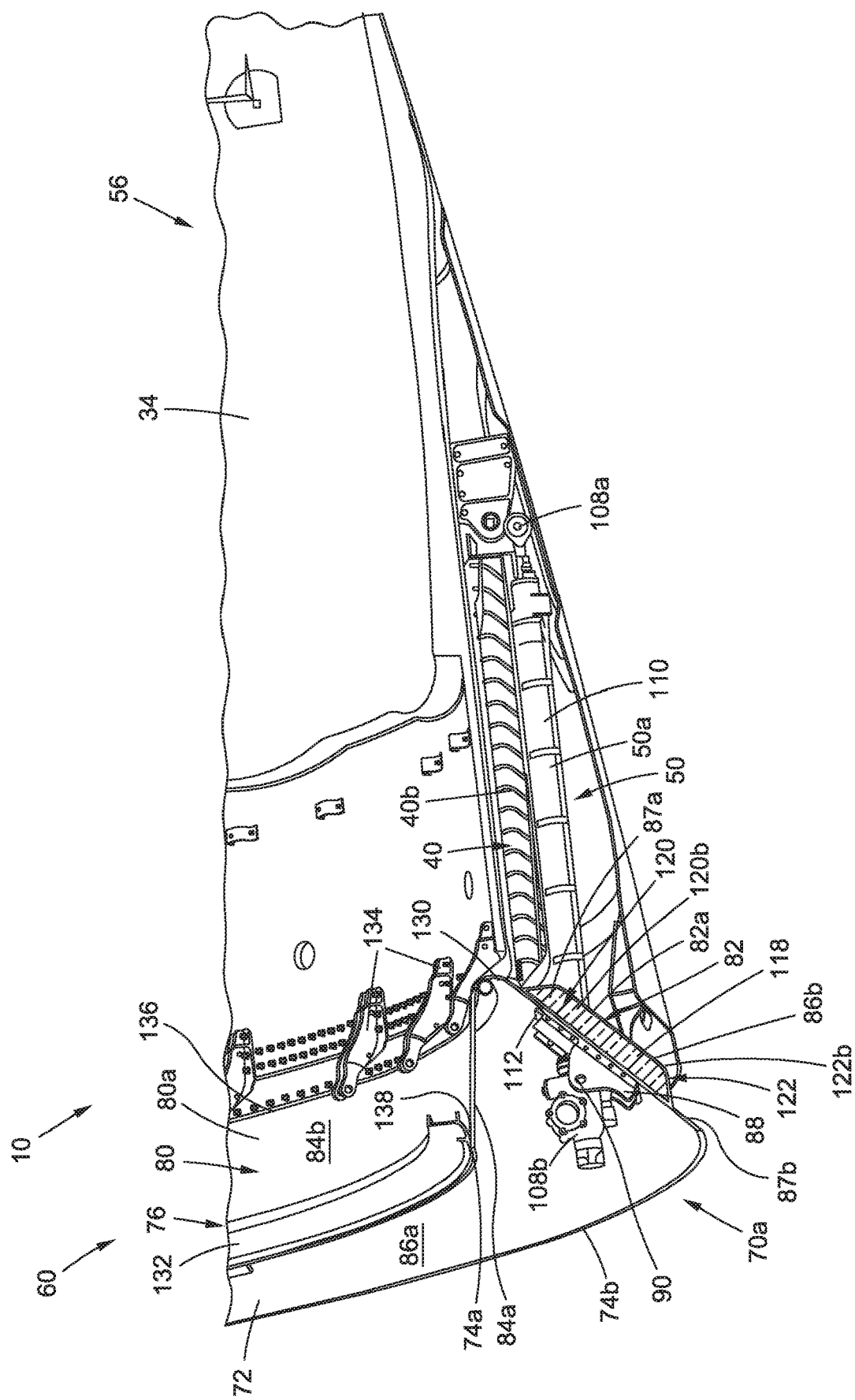
FIG. 5B is an illustration of a perspective partial side view of the load distribution panel system with the circumferential structural panel of FIG. 5A, that also shows a translating sleeve in a stowed position.

Now referring to FIG. 5B, FIG. 5B is an illustration of a perspective partial side view of the load distribution panel system 10 with the load distribution panel assembly 60 comprising the circumferential structural panel 70a with the conical shape 72 of FIG. 5A, that also shows a translating sleeve 34 in a stowed position 56.

As shown in FIG. 5B, the circumferential structural panel 70a includes the first end 74a and the second end 74b both curved forward and projecting outwardly on the same side and in the same direction, and the circumferential panel 70a has the curve 130 that causes the first compliant portion 80, such as in the form of compliant barrel portion 80a, to be curved forward in the same general direction as the second stiffened portion 82, such as in the form of stiffened bulb portion 82a.

The circumferential structural panel 70a (see FIG. 5B) includes the first compliant portion 80 (see FIG. 5B), such as in the form of compliant barrel portion 80a (see FIG. 5B), having the first inner surface 84a (see FIG. 5B) and the first outer surface 84b (see FIG. 5B). As shown in FIG. 5B, the first end 74a is coupled or attached to a fixed structure 76, such as in the form of a load transfer fitting 132, at location 138.

The circumferential structural panel 70a (see FIG. 5B) further includes the second stiffened portion 82 (see FIG. 5B), such as in the form of stiffened bulb portion 82a (see FIG. 5B), having the second inner surface 86a (see FIG. 5B) and the second outer surface 86b (see FIG. 5B). As shown in FIG. 5B, the second stiffened portion 82, such as in the form of stiffened bulb portion 82a, has a closed stiffened cavity portion 87a, a perimeter lip portion 87b, a core interior 118 filled with a stiffened material 120, such as in the form of a foam core 120b, and has a geometric configuration 122, such as in the form of a trapezoid 122b.

FIG. 5B further shows the load applying apparatus 50, such as in the form of TRAS actuator 50a, having the first end 108a, the second end 108b, and the rod body 110, and is attached to the load distribution panel assembly 60 via the TRAS attach fitting 112. FIG. 5B further shows the plurality of cascade members 40, such as in the form of fixed cascade baskets 40b, and shows blocker door attachment devices 134. FIG. 5B further shows the clevis member 88 with attachment opening 90.

Figure 5C:
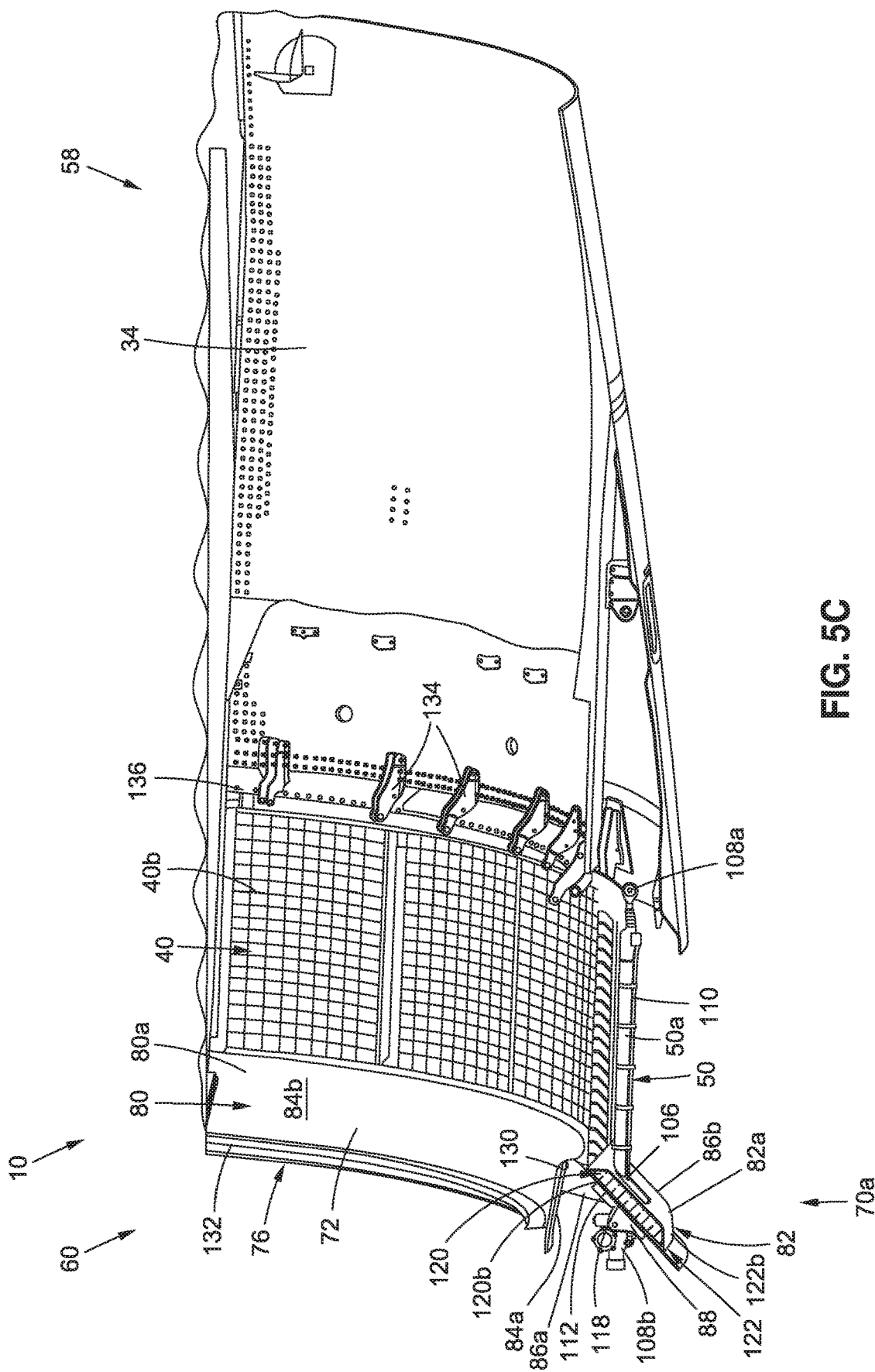
FIG. 5C is an illustration of a perspective partial side view of the load distribution panel system with the circumferential structural panel and translating sleeve of FIG. 5B, that shows the translating sleeve in a deployed position.

Now referring to FIG. 5C, FIG. 5C is an illustration of a perspective partial side view of the load distribution panel system 10 with the load distribution panel assembly 60 comprising the circumferential structural panel 70a with the conical shape 72 of FIG. 5B, that also shows a translating sleeve 34 in a deployed position 58.

As shown in FIG. 5C, the circumferential structural panel 70a includes the curve 130 that causes the first compliant portion 80, such as in the form of compliant barrel portion 80a, to be curved forward in the same general direction as the second stiffened portion 82, such as in the form of stiffened bulb portion 82a. The circumferential structural panel 70a (see FIG. 5C) includes the first compliant portion 80 (see FIG. 5C), such as in the form of compliant barrel portion 80a (see FIG. 5C), having the first inner surface 84a (see FIG. 5C) and the first outer surface 84b (see FIG. 5C). As shown in FIG. 5C, the first compliant portion 80, such as in the form of compliant barrel portion 80a, is coupled or attached to the fixed structure 76, such as in the form of the load transfer fitting 132.

The circumferential structural panel 70a (see FIG. 5C) further includes the second stiffened portion 82 (see FIG. 5C), such as in the form of stiffened bulb portion 82a (see FIG. 5C), having the second inner surface 86a (see FIG. C) and the second outer surface 86b (see FIG. 5C). As shown in FIG. 5C, the second stiffened portion 82, such as in the form of stiffened bulb portion 82a, has the core interior 118 with the stiffened material 120, such as in the form of the foam core 120b, and has the geometric configuration 122, such as in the form of the trapezoid 122b.

FIG. 5C further shows the load applying apparatus 50, such as in the form of TRAS actuator 50a, having the first end 108a, the second end 108b, and the rod body 110, and is attached to the load distribution panel assembly 60 through the attachment opening 106 and via the TRAS attach fitting 112. FIG. 5C further shows the clevis member 88, the plurality of cascade members 40, such as in the form of fixed cascade baskets 40b, and shows attachment devices 134 and the bolted panel 136 abutting the circumferential structural panel 70a. FIG. 5B further shows the clevis member 88 with attachment opening 90.

Figure 6A:
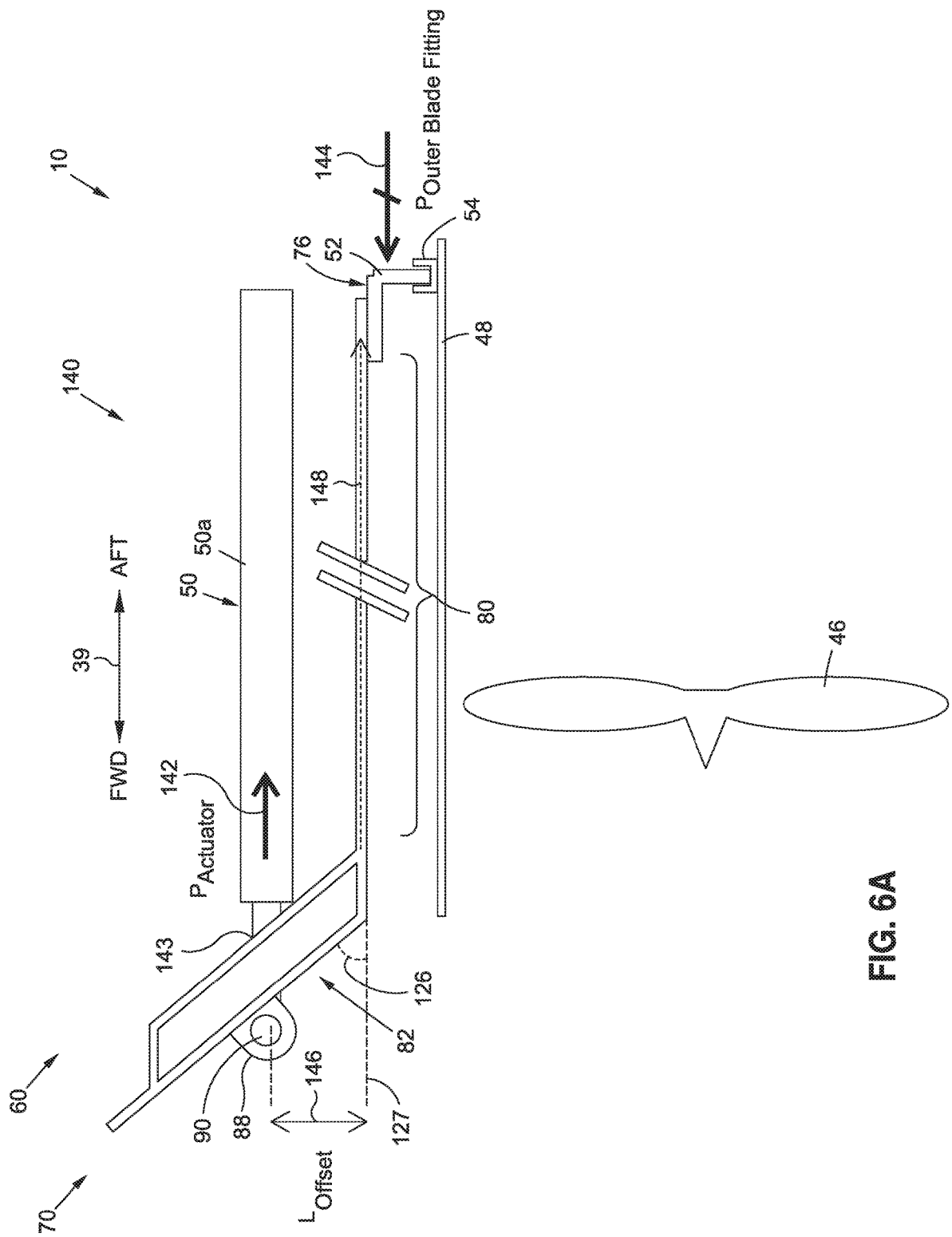
FIG. 6A is a schematic illustration of a load path configuration of an embodiment of a circumferential structural panel of the load distribution panel system of the disclosure.

Now referring to FIG. 6A, FIG. 6A is a schematic illustration of a load path configuration 140 of an embodiment of a load distribution panel assembly 60 comprising the circumferential structural panel 70 of the load distribution panel system 10 (see FIGS. 3A, 7) of the disclosure. FIG. 6A shows the load applying apparatus 50, such as in the form of TRAS actuator 50a, applying a fore/aft point load 142 to the load distribution panel assembly 60 comprising the circumferential structural panel 70, at point load interface 143 at the second stiffened portion 82. FIG. 6A further shows the clevis 88 with the attachment opening 90, and the angle 126 formed by the second stiffened portion 82 bending upwardly from the x-axis 127 in line with the plane of the first compliant portion 80.

FIG. 6A further shows the first compliant portion 80 coupled to the fixed structure 76, such as in the form of outer blade fitting 52. The outer blade fitting 52 (see FIG. 6A) is inserted in or coupled to the outer groove fitting 54 (see FIG. 6A), which is coupled or attached to the engine fan case 48 (see FIG. 6A) surrounding or shrouding the fan 46 (see FIG. 6A). As shown in FIG. 6A, an outer blade fitting reaction force reacts to the fore/aft point load 142.

FIG. 6A further shows a load offset 146 between the load applying apparatus 50 and the load distribution panel assembly 60. The load distribution panel assembly 60 (see FIG. 6A) takes the load 142 with offset 146 (see FIG. 6A) and reacts it in in-plane loads 147 (see FIG. 6B) creating minimal bending in the load distribution panel assembly 60. FIG. 6A further shows a load path 148 of the fore/aft point load 142 to the fixed structure 76, such as in the form of the outer blade fitting 52, that is more efficient than known assemblies, systems, and methods. The primary feature that drives a more efficient load path 148 (see FIG. 6A) is the use of the second stiffened portion 82 (see FIG. 6A), which is angled, preferably at an angle 126 (see FIG. 6A) of between 25° (twenty-five degrees) and 80° (eighty degrees), with respect to the first compliant portion 80 (see FIG. 6A); and more preferably, at an angle 126 between 45° (forty-five degrees) and 60° (sixty degrees), with respect to the first compliant portion 80 (see FIG. 6A). A forward-aft direction arrow 39 (see FIG. 6A) indicates that the load path 148 (see FIG. 6A) transmitting from forward to aft.

Figure 6B:
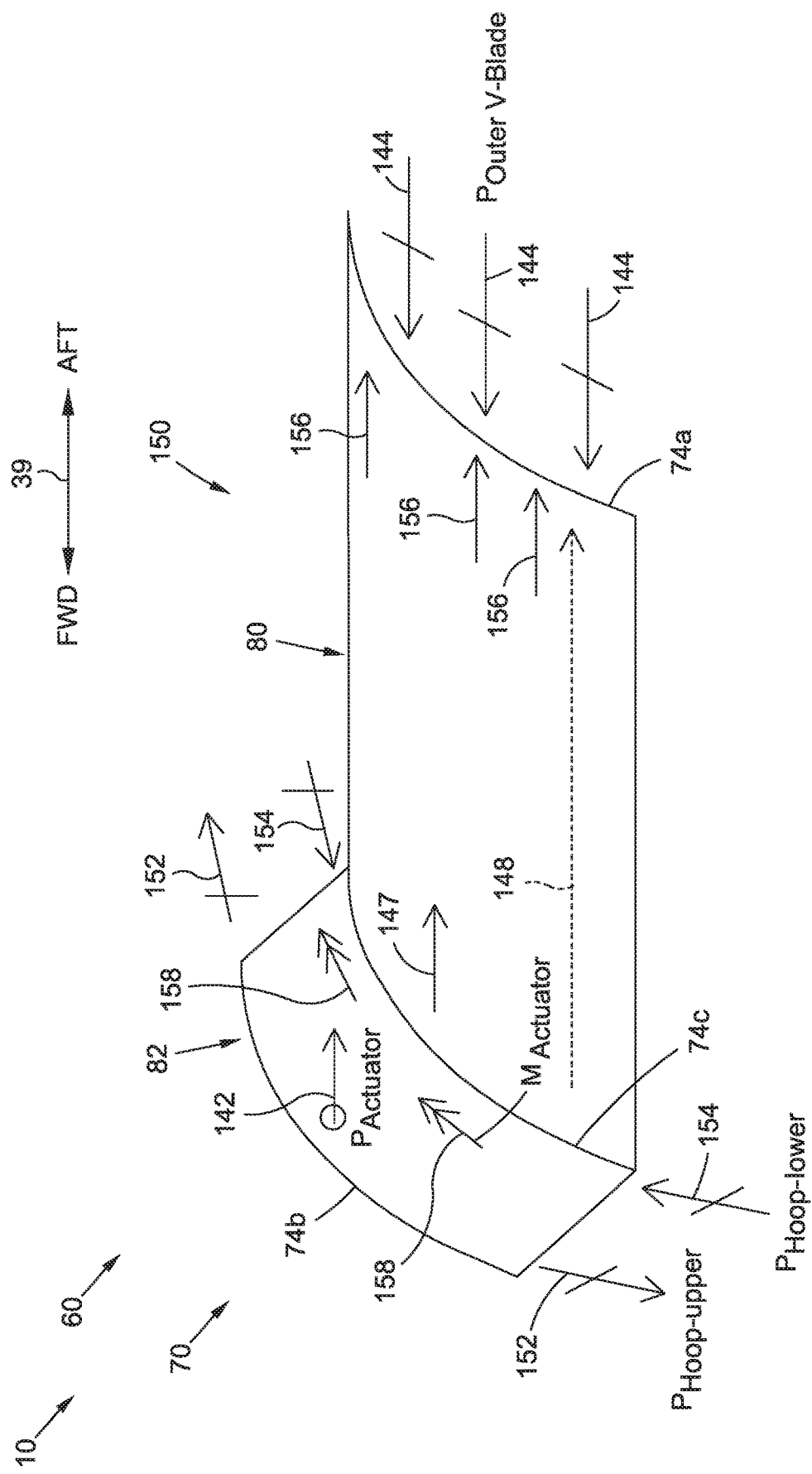
FIG. 6B is a schematic illustration of a loading diagram of the circumferential structural panel of FIG. 6A.

Now referring to FIG. 6B, FIG. 6B is a schematic illustration of a loading diagram 150 of an embodiment of a load distribution panel assembly 60 comprising the circumferential structural panel 70 of FIG. 6A. FIG. 6B shows the first end 74a and the second end 74b of the load distribution panel assembly 60, and shows the first compliant portion 80 and the second stiffened portion 82 of the load distribution panel assembly 60. FIG. 6B further shows the fore/aft point load 142 to the load distribution panel assembly 60 comprising the circumferential structural panel 70, at the second stiffened portion 82. FIG. 6B shows the outer blade fitting reaction force 144 reacting to the fore/aft point load 142.

The load distribution panel assembly 60 (see FIG. 6B) effectively converts the fore/aft point load 142 (see FIG. 6B) applied to the load distribution panel assembly 60 (see FIG. 6B) by the load applying apparatus 50 (see FIG. 6A), such as the TRAS actuator 50a (see FIG. 6A), to a hoop tension load 152 (see FIG. 6B) and a hoop compression load 154 (see FIG. 6B), and reacts the load offset 146 (see FIG. 6A) between the load applying apparatus 50 (see FIG. 6A) and the load distribution panel assembly 60 (see FIG. 6B), in one or more in-plane loads 147 (see FIG. 6B). This provides a uniform load distribution 156 (see FIG. 6B) of the fore/aft point load 142 (see FIG. 6B), through the load distribution panel assembly 60 (see FIG. 6B), and to the fixed structure 76 (see FIG. 6A). The load distribution panel assembly 60 (see FIG. 6B) is more efficient in the continuous and uniform distribution of the fore/aft point load 142 (see FIG. 6B) onto the fixed structure 76 (see FIG. 6A) of the gas turbine engine 16a (see FIGS. 2A, 7), as compared to known systems, assemblies, and methods for a gas turbine engine.

The fore/aft point load 142 (see FIG. 6B) and the outer blade fitting reaction force 144 (see FIG. 6B) generate a moment couple 158 (see FIG. 6B), which is reacted as the hoop tension load 152 (see FIG. 6B) and the hoop compression load 154 (see FIG. 6B) in the hoop direction of the second stiffened portion 82 (see FIG. 6B), through allowing the second stiffened portion 82 to rotate in the direction of the moment couple 158 (see FIG. 6B) into the first compliant portion 80 (see FIG. 6B). As shown in FIG. 6B, the load path 148 transmits the fore/aft point load 142 which transfer or jump over the load offset 146 (see FIG. 6A) and into the in-plane loads 147, instead of out-of-plane loads, in the load distribution panel assembly 60, and transfer to the fixed structure 76 (see FIG. 6A), such as the outer blade fitting 52 (see FIG. 6A), all with minimal supporting structure or reinforcement.

Now referring to FIG. 7, FIG. 7 is an illustration of a functional block diagram showing an exemplary embodiment of a load distribution panel system 10 the disclosure. In another embodiment of the disclosure, as shown in FIG. 7, there is provided a load distribution panel system 10 for providing a uniform load distribution 156 in an engine 16, such as a gas turbine engine 16a of a vehicle 12.

As shown in FIG. 7, the vehicle 12 may comprise one of, an aircraft 12a, an automobile 12b, a watercraft such as a submarine 12d, or another suitable vehicle 12. As further shown in FIG. 7, the engine 16, such as the gas turbine engine 16a, may comprise a thrust reverser assembly 26, a thrust reverser cowl 24 with an inlet cowl 30, a fixed member 32, and a translating member 34, a plurality of cascade members 40, and one or more fixed structures 76. The plurality of cascade members 40 (see FIG. 7) may comprise translating cascade baskets 40a (see FIGS. 2A, 3B) or fixed cascade baskets 40b (see FIG. 5A). As shown in FIG. 7, the one or more fixed structures 76 may comprise a gas turbine engine fixed structure 76a comprising one of, an engine fan case 48, an outer blade fitting 52, an outer groove fitting 54, a translating sleeve bulkhead 78, a load transfer fitting 132, or another suitable fixed structure.

As shown in FIG. 7, the load distribution panel system 10 comprises a load distribution panel assembly 60 having a panel structure 61 with at least one panel portion 62a, and in an embodiment, for example, two panel portions 62a, 62b, or more than two panel portions. Each panel portion 62a, 62b comprises a circumferential structural panel 70 (see FIG. 3A) or circumferential structural panel 70a (see FIG. 5B). Each circumferential structural panel 70, 70a has a conical shape 72, a cylindrical shape, a circular shape, an axisymmetric shape, or another suitable shape.

As shown in FIG. 7, each circumferential structural panel 70, 70a comprises a first end 74a and a second end 74b, a first compliant portion 80, and a second stiffened portion 82. The first end 74a (see FIG. 7) is coupled to the fixed structure 76 (see FIG. 7) of the gas turbine engine 16a (see FIG. 7) of the vehicle 12 (see FIG. 7).

As further shown in FIG. 7, the first compliant portion 80 comprises a compliant barrel portion 80a. As shown in FIGS. 3A and 5B, and as discussed above, the first compliant portion 80, such as in the form of compliant barrel portion 80a, extends radially away from the first end 74a. The first compliant portion 80 (see FIG. 7), such as in the form of compliant barrel portion 80a (see FIG. 7) has a first inner surface 84a (see FIGS. 3A, 5B) and a first outer surface 84b (see FIGS. 3A, 5B).

As further shown in FIG. 7, the second stiffened portion 82 comprises a stiffened bulb portion 82a having a closed stiffened cavity portion 87a integral with a perimeter lip portion 87b. As shown in FIGS. 3A and 5B, the second stiffened portion 82, such as in the form of stiffened bulb portion 82a, is angled with respect to the first compliant portion 80, such as in the form of compliant barrel portion

80*a*, and extends radially away from the first compliant portion 80, such as in the form of compliant barrel portion 80*a*, and terminates at the second end 74*b*. The second stiffened portion 82 (see FIG. 7), such as in the form of stiffened bulb portion 82*a* (see FIG. 7), is preferably angled with respect to the first compliant portion 80 (see FIG. 7), such as in the form of compliant barrel portion 80*a* (see FIG. 7), preferably, at an angle 126 (see FIG. 7) between 25° (twenty-five degrees) and 80° (eighty degrees); and more preferably, at an angle 126 between 45° (forty-five degrees) and 60° (sixty degrees).

The second stiffened portion 82 (see FIGS. 3A, 5B, 7), such as in the form of stiffened bulb portion 82*a* (see FIGS. 3A, 5B, 7), has a second inner surface 86*a* (see FIGS. 3A, 5B) and a second outer surface 86*b* (see FIGS. 3A, 5B). As shown in FIG. 7, the second stiffened portion 82, such as in the form of stiffened bulb portion 82*a*, comprises a sandwich structure 116 and a non-quasi isotropic laminate 117 may be used to form the second stiffened portion 82. As further shown in FIG. 7, the closed stiffened cavity portion 87*a* of the second stiffened portion 82, such as in the form of stiffened bulb portion 82*a*, in one embodiment has a core interior 118 in the form of a filled core interior 118*a* filled with a stiffened material 120 comprising one of, a honeycomb core 120*a*, a foam core 120*b*, or another suitable stiffened material. In another embodiment, the core interior 118 (see FIG. 7) of the closed stiffened cavity portion 87*a* (see FIG. 7) has a hollow core interior 118*b* (see FIG. 7).

As further shown in FIG. 7, the closed stiffened cavity portion 87*a* of the second stiffened portion 82, such as in the form of stiffened bulb portion 82*a*, has a geometric configuration 122 comprising one of, a parallelogram 122*a*, a trapezoid 122*b*, a rectangle 122*c*, an ellipse 122*d*, or another suitable geometric configuration. Preferably, the second stiffened portion 82 (see FIG. 7), such as in the form of stiffened bulb portion 82*a* (see FIG. 7), is a reinforced torque capable section 128 (see FIG. 7). As further shown in FIG. 7, first compliant portion 80 and the second stiffened portion 82 have a stiffness 124, where the second stiffened portion 82, such as in the form of stiffened bulb portion 82*a*, has a stiffness 124, such as a second stiffened portion bending and torsion stiffness 124*b*, that is much greater, for example, 100 (one hundred) times to 1000 (one thousand) times greater, than a stiffness 124, such as a first compliant portion bending and torsion stiffness 124*a*, of the first compliant portion 80, such as in the form of compliant barrel portion 80*a*.

As further shown in FIG. 7, the load distribution panel system 10 further comprises one or more load applying apparatuses 50, such as in the form of thrust reverser actuation system (TRAS) actuators 50*a*, which is/are coupled to the load distribution panel assembly 60. The TRAS actuators 50*a* (see FIG. 7) may be coupled or attached to the load distribution panel assembly 60 (see FIG. 7) with one or more TRAS attach fittings 112 (see FIGS. 3A, 5B, 7).

As further shown in FIG. 7, the load distribution panel system 10 may further comprise one or more clevis members 88 coupled to the second inner surface 86*a* of the second stiffened portion 82, such as in the form of stiffened bulb portion 82*a*, of each circumferential structural panel 70, 70*a*, to facilitate attachment of the one or more load applying apparatuses 50, such as in the form of TRAS actuators 50*a*, to the load distribution panel assembly 60.

As further shown in FIG. 7, the load distribution panel system 10 may further comprise an upper beam assembly 96 coupled to an upper end 64*a* (see FIG. 3A) of each panel portion 62*a*, 62*b*. As shown in FIGS. 3A and 7, the upper beam assembly 96 may comprise one or more upper elements 68, such as in the form of hinge elements 68*a* (see FIG. 2B).

As further shown in FIG. 7, the load distribution panel system 10 may further comprise a lower beam assembly 100 coupled to a lower end 64*b* (see FIG. 3A) of each panel portion 62*a*, 62*b*. As shown in FIGS. 3A and 7, the lower beam assembly 100, such as in the form of latch beam assembly 100*a*, may comprise one or more lower elements 102, such as in the form of latch elements 102*a*.

The load distribution panel assembly 60 (see FIG. 7) converts one or more structural loads 145 (see FIG. 7), such as fore/aft point loads 142 (see FIG. 7), applied to the load distribution panel assembly 60 (see FIG. 7) by the one or more load applying apparatuses 50 (see FIG. 7), such as the TRAS actuators 50*a* (see FIG. 7), to a hoop tension load 152 (see FIG. 7) and a hoop compression load 154 (see FIG. 7). The load distribution panel assembly 60 (see FIG. 7) reacts a load offset 146 between the one or more load applying apparatuses 50 (see FIG. 7), such as the TRAS actuators 50*a* (see FIG. 7), and the load distribution panel assembly 60 (see FIG. 7), in one or more in-plane loads 147 (see FIG. 7), to provide a uniform load distribution 156 (see FIG. 7) of the one or more fore/aft point loads 142 (see FIG. 7), through the load distribution panel assembly 60 (see FIG. 7), and to the fixed structure 76 (see FIG. 7).

The fore/aft point loads 142 (see FIG. 7) and the outer blade fitting reaction force 144 (see FIGS. 6B, 7) generate a force couple 158 (see FIG. 7), which is reacted as hoop tension load 152 (see FIGS. 6B, 7) and hoop compression load 154 (see FIGS. 6B, 7) in the hoop direction of the second stiffened portion 82 (see FIGS. 4A, 6A, 7), such as in the form of stiffened bulb portion 82*a* (see FIGS. 4A, 7), through allowing the second stiffened portion 82, such as in the form of stiffened bulb portion 82*a*, to rotate in the direction of the force couple 158 (see FIG. 7) into the first compliant portion 80 (see FIGS. 4A, 6A, 7), such as in the form of compliant barrel portion 80*a* (see FIGS. 4A, 7). The force couple 158 (see FIG. 7) includes two equal and opposite forces whose line of action do not coincide. A moment 159 (see FIG. 7) generated by force couple 158 (see FIG. 7) is the product of the magnitude of one of the forces and the perpendicular distance between their lines of action. The fore/aft point loads 142 (see FIG. 7) arrive at the outer blade fitting 52 (see FIG. 7) as a uniform load distribution 156 (see FIG. 7), instead of as discrete point loads. The first compliant portion 80 (see FIGS. 4A, 6A, 7), such as in the form of compliant barrel portion 80*a* (see FIGS. 4A, 7), has a compliant composition which allows a hinging effect 157 (see FIG. 7) which converts the fore/aft point loads 142 (see FIG. 7) to the hoop tension load 152 (see FIGS. 6B, 7) and the hoop compression load 154 (see FIGS. 6B, 7).

The load distribution panel assembly 60 (see FIG. 7) and the load distribution panel system 10 (see FIG. 7) provide a load path 148 (see FIG. 7) for the fore/aft point loads 142 (see FIG. 7) to the fixed structure 76 (see FIG. 7), such as the outer blade fitting 52 (see FIG. 7). In addition, the load distribution panel assembly 60 (see FIG. 7) and the load distribution panel system 10 (see FIG. 7) provide for a reduced structural reinforcement 162 (see FIG. 7) or support, a reduced complexity 164 (see FIG. 7), and a reduced part count 166 (see FIG. 7), as compared to known assemblies, systems, and methods for a gas turbine engine.

Figure 8:
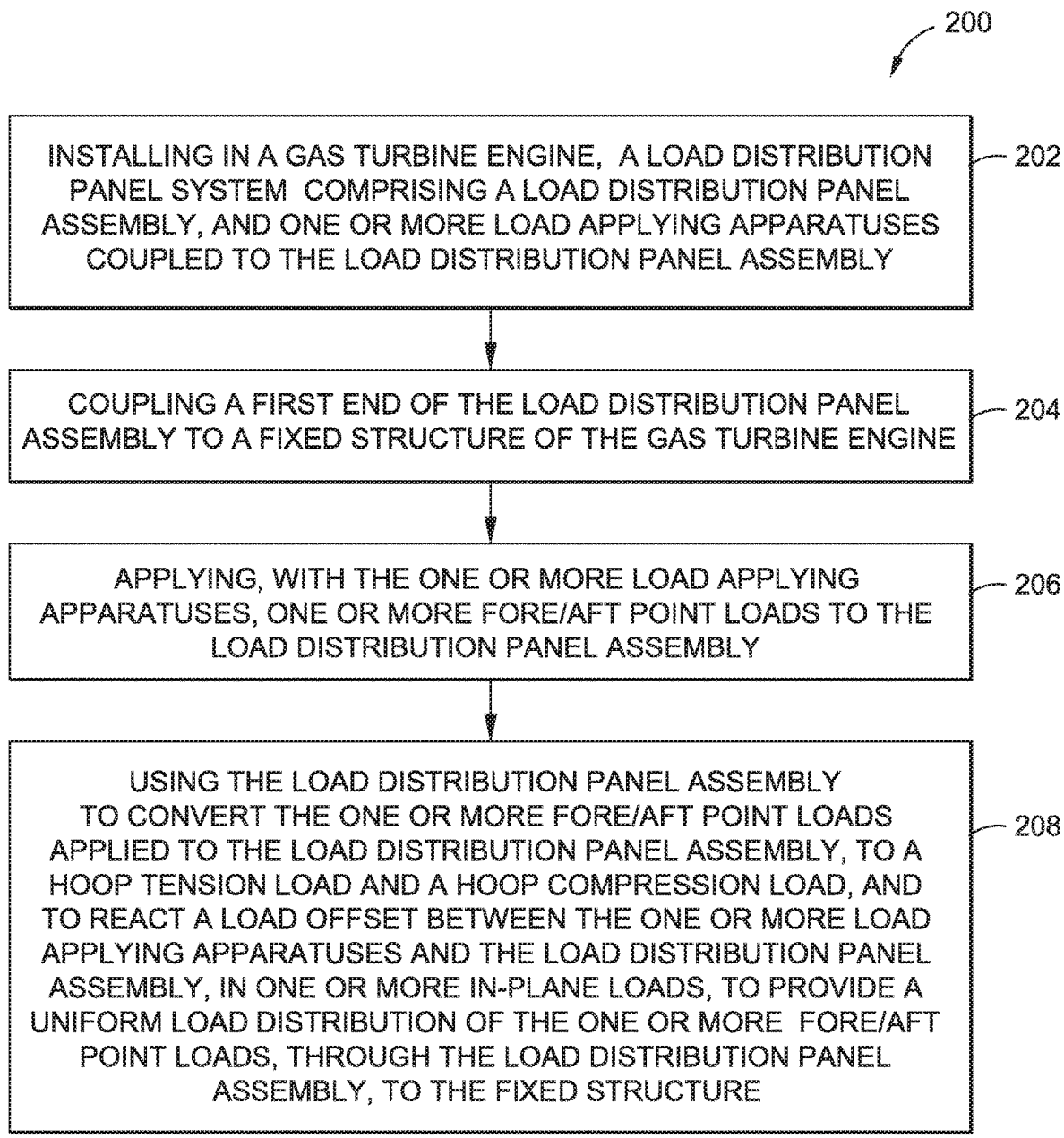
FIG. 8 is an illustration of a flow diagram showing an exemplary embodiment of a method of the disclosure.

Now referring to FIG. 8, FIG. 8 is an illustration of a flow diagram showing an exemplary embodiment of a method 200 of the disclosure. In another embodiment of the disclosure, as shown in FIG. 8, there is provided a method 200 for providing a uniform load distribution 156 (see FIG. 7) in a gas turbine engine 16a (see FIGS. 1, 2A, 7) of a vehicle 12 (see FIGS. 1, 7).

As shown in FIG. 8, the method 200 comprises step 202 of installing in the gas turbine engine 16a (see FIGS. 1, 2A, 7), a load distribution panel system 10 (see FIGS. 1, 3A, 5B, 7) comprising a load distribution panel assembly 60 (see FIGS. 3A, 5B, 7), and one or more load applying apparatuses 50 (see FIGS. 3A, 5B, 7) coupled to the load distribution panel assembly 60. As discussed in detail above, the load distribution panel assembly 60 (see FIGS. 3A, 5A, 7) comprise a panel structure 61 (see FIG. 3A) having at least two panel portions 62a, 62b (see FIG. 3A).

Each panel portion 62a, 62b (see FIG. 3A) comprises a circumferential structural panel 70, 70a (see FIGS. 3A, 4A, 5B, 7). Each circumferential structural panel 70, 70a (see FIGS. 3A, 4A, 5B, 7) comprises a first end 74a (see FIGS. 3A, 4A, 5B, 7) and a second end 74b (see FIGS. 3A, 4A, 5B, 7) coupled to a fixed structure 76 (see FIGS. 3A, 5B, 7).

Each circumferential structural panel 70, 70a (see FIGS. 3, 4A, 5B, 7) further comprises a first compliant portion 80 (see FIGS. 3, 4A, 5B, 7) extending radially away from the first end 74a (see FIGS. 3A, 4A, 5B, 7). The first compliant portion 80 (see FIGS. 3A, 4A, 5B) has a first inner surface 84a (see FIGS. 3A, 4A, 5B) and a first outer surface 84b (see FIGS. 3A, 4A, 5B).

Each circumferential structural panel 70, 70a (see FIGS. 3A, 4A, 5B, 7) further comprises a second stiffened portion 82 (see FIGS. 3A, 4A, 5B, 7) angled with respect to the first compliant portion 80 (see FIGS. 3A, 4A, 5B, 7) and extending radially away from the first compliant portion 80, and terminating at the second end 74b (see FIGS. 3A, 4A, 5B, 7). The step 202 (see FIG. 8) of installing the load distribution panel system 10 (see FIGS. 1, 3A, 5B, 7) in the gas turbine engine 16a (see FIGS. 1, 2A, 7) comprises angling the second stiffened portion 82 (see FIGS. 3A, 4A, 5B, 7) with respect to the first compliant portion 80 (see FIGS. 3, 4A, 5B, 7), preferably, at an angle 126 (see FIGS. 4A, 6A) between 25° (twenty-five degrees) and 80° (eighty degrees); and more preferably, at an angle 126 between 45° (forty-five degrees) and 60° (sixty degrees).

The second stiffened portion 82 (see FIGS. 3A, 4A, 5B) has a second inner surface 86a (see FIGS. 3A, 4A, 5B) and a second outer surface 86b (see FIGS. 3A, 4A, 5B), and has a closed stiffened cavity portion 87a (see FIGS. 3A, 4A, 5B) integral with a perimeter lip portion 87b (see FIGS. 3A, 4A, 5B).

The step 202 (see FIG. 8) of installing the load distribution panel system 10 (see FIGS. 1, 3A, 5B, 7) in the gas turbine engine 16a (see FIGS. 1, 2A, 7) comprises installing the load distribution panel system 10 (see FIGS. 1, 3A, 5B, 7) in the gas turbine engine 16a (see FIGS. 1, 2A, 7) of the vehicle 12 (see FIGS. 1, 7) comprising one of, an aircraft 12a (see FIGS. 1, 7), an automobile 12b (see FIG. 7), a watercraft 12c (see FIG. 7), a submarine 12d (see FIG. 7), or another suitable vehicle 12 (see FIG. 7).

As shown in FIG. 8, the method 200 further comprises step 204 of coupling the first end 74a (see FIGS. 3A, 4A, 5B, 7) of the circumferential structural panel 70, 70a (see FIGS. 3A, 4A, 5B, 7) of the load distribution panel assembly 60 (see FIGS. 3A, 4A, 5B, 7) to the fixed structure 76 (see FIGS. 3A, 5B, 7) of the gas turbine engine 16a (see FIGS. 1, 2A, 7). The step 204 (see FIG. 8) of coupling the first end 74a (see FIGS. 3A, 4A, 5B, 7) of the load distribution panel assembly 60 (see FIGS. 3A, 4A, 5B, 7) to the fixed structure 76 (see FIGS. 3A, 5B, 7) of the gas turbine engine 16a (see FIGS. 2A, 7) comprises coupling the first end 74a (see FIGS. 3A, 4A, 5B, 7) to the fixed structure 76 (see FIGS. 3A, 5B, 7) comprising one of, an engine fan case 48 (see FIGS. 2A, 7), an outer blade fitting 52 (see FIGS. 2A, 6A, 7), an outer groove fitting 54 (see FIGS. 2A, 7), a translating sleeve bulkhead 78 (see FIGS. 3A, 7), a load transfer fitting 132 (see FIGS. 5B, 7), or another suitable fixed structure 76.

As shown in FIG. 8, the method 200 further comprises step 206 of applying, with the one or more load applying apparatuses 50 (see FIGS. 3A, 5B, 6A-6B, 7), one or more fore/aft point loads 142 (see FIGS. 6A-6B, 7) to the load distribution panel assembly 60 (see FIGS. 3A, 4A, 5B, 7). The step 206 (see FIG. 8) of applying, with the one or more load applying apparatuses 50 (see FIGS. 3A, 5B, 6A-6B, 7), one or more fore/aft point loads 142 (see FIGS. 6A-6B) to the load distribution panel assembly 60 (see FIGS. 3A, 5B, 6A-6B, 7) comprises applying, with the one or more load applying apparatuses 50 (see FIGS. 3A, 5B, 6A-6B, 7), comprising one or more thrust reverser actuation system (TRAS) actuators 50a (see FIGS. 2A, 3A, 5B, 6A, 7) having a first end 108a (see FIGS. 3A, 5B) attached to a translating sleeve 34 (see FIG. 5B) of a thrust reverser assembly 26 (see FIG. 2A), and having a second end 108b (see FIGS. 3A, 5B) attached to the closed stiffened cavity portion 87a (see FIGS. 3A, 5B) of the second stiffened portion 82 (see FIGS. 3A, 5B).

As shown in FIG. 8, the method 200 further comprises step 208 of using the load distribution panel assembly 60 (see FIGS. 3A, 4A, 5B, 7) to convert the one or more fore/aft point loads 142 (see FIGS. 6A-6B, 7) applied to the load distribution panel assembly 60, to a hoop tension load 152 (see FIGS. 6A-6B, 7) and a hoop compression load 154 (see FIGS. 6A-6B, 7), and to react a load offset 146 (see FIG. 6A, 7) between the one or more load applying apparatuses 50 (see FIGS. 6A, 7) and the load distribution panel assembly 60, in one or more in-plane loads 147 (see FIGS. 6A-6B, 7). This provides the uniform load distribution 156 (see FIGS. 6A-6B, 7) of the one or more fore/aft point loads 142 (see FIGS. 6A-6B, 7), through the load distribution panel assembly 60 (see FIGS. 6A-6B, 7), and to the fixed structure 76 (see FIGS. 6A, 7).

The method 200 (see FIG. 8) does not require additional structural support or reinforcement to react or overcome the load offset 146 (see FIG. 6A), and thus results in reduced structural reinforcement 162 (see FIG. 7) required, reduced complexity 164 (see FIG. 7), and reduced part count 166 (see FIG. 7), as compared to known methods of load distribution in a gas turbine engine.

Figure 9:
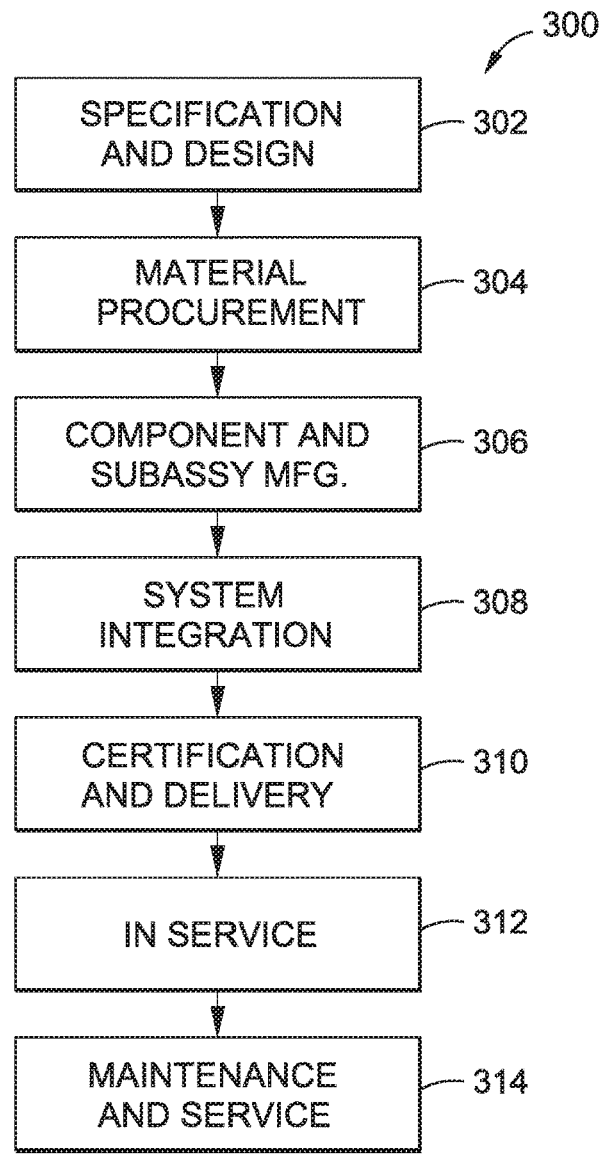
FIG. 9 is an illustration of a flow diagram of an aircraft manufacturing and service method.
Figure 10:
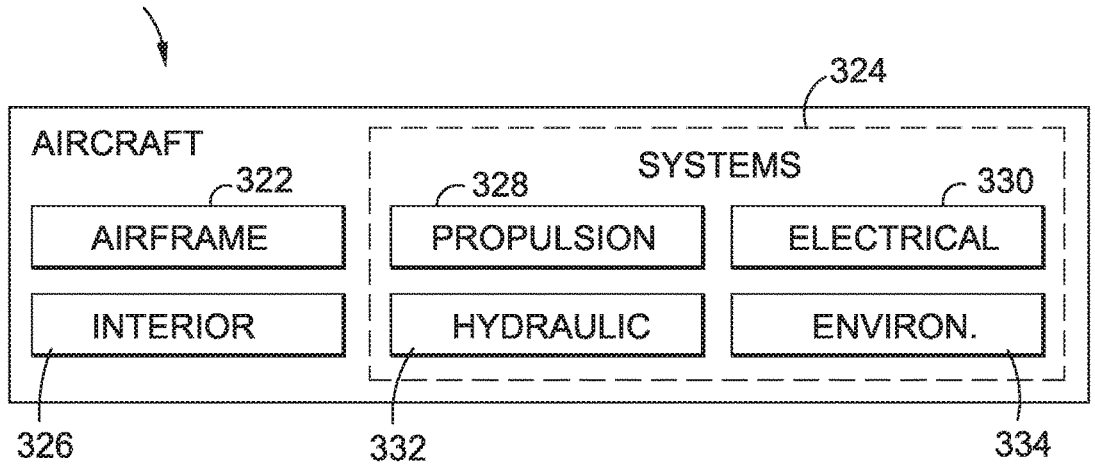
FIG. 10 is an illustration of a functional block diagram of an aircraft.

FIG. 9 is an illustration of a flow diagram of an aircraft manufacturing and service method 300. FIG. 10 is an illustration of a functional block diagram of an aircraft 320. Referring to FIGS. 9-10, embodiments of the disclosure may be described in the context of the aircraft manufacturing and service method 300 as shown in FIG. 9, and the aircraft 320 as shown in FIG. 10.

As shown in FIG. 9, during pre-production, exemplary aircraft manufacturing and service method 300 may include specification and design 302 of the aircraft 320 and material procurement 304. As further shown in FIG. 9, during manufacturing, component and subassembly manufacturing 306 and system integration 308 of the aircraft 320 takes place. Thereafter, the aircraft 320 may go through certification and delivery 310 (see FIG. 9) in order to be placed in service 312 (see FIG. 9). While in service 312 by a customer, the aircraft 320 may be scheduled for routine maintenance and service 314 (see FIG. 9) (which may also include modification, reconfiguration, refurbishment, and other suitable services).

Each of the processes of the aircraft manufacturing and service method 300 (see FIG. 9) may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 320 produced by the exemplary aircraft manufacturing and service method 300 may include an airframe 322 with a plurality of systems 324 and an interior 326. Examples of the plurality of systems 324 may include one or more of a propulsion system 328 (see FIG. 10), an electrical system 330 (see FIG. 10), a hydraulic system 332 (see FIG. 10), and an environmental system 334 (see FIG. 10). Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 9). For example, components or subassemblies corresponding to component and subassembly manufacturing 306 (see FIG. 9) may be fabricated or manufactured in a manner similar to components or subassemblies produced while the aircraft 320 (see FIG. 10) is in service 312 (see FIG. 9). Also, one or more apparatus embodiments, method embodiments, or a combination thereof, may be utilized during component and subassembly manufacturing 306 (see FIG. 9) and system integration 308 (see FIG. 9), for example, by substantially expediting assembly of or reducing the cost of the aircraft 320 (see FIG. 10). Similarly, one or more of apparatus embodiments, method embodiments, or a combination thereof, may be utilized while the aircraft 320 (see FIG. 10) is in service 312 (see FIG. 9), for example and without limitation, to maintenance and service 314 (see FIG. 9).

Embodiments of the load distribution panel system 10 (see FIGS. 3A, 5B, 7), the load distribution panel assembly 60 (see FIGS. 3A, 5B, 7), and the method 200 (see FIG. 8) for providing a uniform load distribution 156 (see FIGS. 6B, 7) in a gas turbine engine 16a (see FIGS. 1, 2A, 7) effectively convert one or more fore/aft point loads 142 (see FIGS. 6A-6B, 7) applied to the load distribution panel assembly 60 (see FIGS. 3A, 5B, 7) by the one or more load applying apparatuses 50 (see FIGS. 6A, 7), such as the one or more TRAS actuators 50a (see FIGS. 6A, 7), to a hoop tension load 152 (see FIGS. 6B, 7) and a hoop compression load 154 (see FIGS. 6B, 7), and react a load offset 146 (see FIGS. 6A, 7) between the one or more load applying apparatuses 50 (see FIGS. 6A, 7) and the load distribution panel assembly 60, in one or more in-plane loads 147 (see FIGS. 6B, 7). This provides a uniform load distribution 156 (see FIGS. 6B, 7) of the one or more fore/aft point loads 142 (see FIGS. 6B, 7), through the load distribution panel assembly 60 (see FIGS. 6B, 7) of the load distribution panel system 10 (see FIG. 7), and to the fixed structure 76 (see FIGS. 6A, 7). Embodiments of the load distribution panel system 10 (see FIGS. 3A, 5B, 7), the load distribution panel assembly 60 (see FIGS. 3A, 5B, 7), and the method 200 (see FIG. 8) are more efficient in the continuous and uniform distribution of the fore/aft point loads 142 (see FIGS. 6A-6B, 7) onto the fixed structure 76 (see FIGS. 6A, 7) of the gas turbine engine 16a (see FIGS. 2A, 7), as compared to known systems, assemblies, and methods for a gas turbine engine.

Further, embodiments of the load distribution panel system 10 (see FIGS. 3A, 5B, 7), the load distribution panel assembly 60 (see FIGS. 3A, 5B, 7), and the method 200 (see FIG. 8) effectively distribute the hoop tension load 152 (see FIGS. 6B, 7) and the hoop compression load 154 (see FIGS. 6B, 7) in in-plane loads 147 (see FIG. 6B) onto the circumferential structural panel 70 (see FIGS. 6B, 7) of the load distribution panel assembly 60 (see FIGS. 6B, 7). The primary feature that drives a more efficient load path 148 (see FIGS. 6A-6B, 7) is the use of the second stiffened portion 82, such as in the form of the stiffened bulb portion 82a (see FIGS. 4A, 7), which is angled, with respect to the first compliant portion 80 (see FIGS. 4A, 7), such as in the form of the compliant barrel portion 80a (see FIGS. 4A, 7), preferably, at an angle 126 (see FIGS. 4A, 7) of between 25° (twenty-five degrees) and 80° (eighty degrees); and more preferably, at an angle 126 between 45° (forty-five degrees) and 60° (sixty degrees). The second stiffened portion 82 (see FIGS. 4A, 7) is preferably in the form of a reinforced torque capable section 128 (see FIG. 7) and is coupled to the first compliant portion 80 (see FIGS. 4A, 7), which has a compliant composition that allows a hinging effect 157 (see FIG. 7) to convert the fore/aft point loads 142 (see FIGS. 6A-6B, 7) to the hoop tension load 152 (see FIGS. 6B, 7) and the hoop compression load 154 (see FIGS. 6B, 7). Important dimensions of the load distribution panel assembly 60 (see FIGS. 3A, 5B, 7) include the load offset 146 (see FIGS. 6A, 7) between the one or more load applying apparatuses 50 (see FIGS. 6A, 7), such as the one or more TRAS actuators 50a (see FIGS. 6A, 7), and the load distribution panel assembly 60 (see FIGS. 3A, 5B, 7), as well as the angle 126 (see FIGS. 4A, 7) formed between the second stiffened portion 82 and the first compliant portion 80.

When the fore/aft point loads 142 (see FIGS. 6A-6B, 7) are applied to the load distribution panel assembly 60 (see FIGS. 3A, 5B, 7) by the one or more load applying apparatuses 50 (see FIGS. 6A, 7), such as the one or more TRAS actuators 50a (see FIGS. 6A, 7), since the compliant barrel portion 80a (see FIGS. 3A, 4A, 5B) is not as thick as the stiffened bulb portion 82a (see FIGS. 3A, 4A, 5B), it allows the compliant barrel portion 80a to roll backward and it generates a hoop tension load 152 (see FIG. 6B) on the second end 74b (see FIG. 6B), or upper end, and a hoop compression load 154 (see FIG. 6B) on the angled, or lower end, of the stiffened bulb portion 82a (see FIGS. 3A, 4A, 5B). The load distribution panel assembly 60 (see FIGS. 3A, 5B, 7) takes the load offset 146 (see FIG. 6A) and reacts it in in-plane loads 147 (see FIG. 6B) without creating any bending in the load distribution panel assembly 60.

The load distribution panel assembly 60 (see FIGS. 3A, 5B, 7) acts as an extension to the fixed structure 76 (see FIGS. 3A, 5B, 6A), such as the outer blade fitting 52 (see FIGS. 2A, 6A) (or other fixed structure), which is coupled to the outer groove fitting 54 (see FIGS. 2A, 6A), which is attached to the engine fan case 48 (see FIGS. 2A, 6A), of, for example, a thrust reverser assembly 26 (see FIG. 2A), and thus provides a load path 148 (see FIGS. 6A-6B) for the fore/aft point loads 142 (see FIGS. 6A-6B) applied by the one or more load applying apparatuses 50 (see FIGS. 6A, 7), such as the one or more TRAS actuators 50a (see FIGS. 6A, 7). The fore/aft point loads 142 (see FIGS. 6A-6B) transfer or arrive at the fixed structure 76 (see FIGS. 6A), such as the outer blade fitting 52 (see FIGS. 2A, 6A) (or other fixed structure), as a uniform load distribution 156 (see FIGS. 6B, 7), instead of as discrete point loads. With embodiments of the load distribution panel system 10 (see FIGS. 3A, 5B, 7), the load distribution panel assembly 60 (see FIGS. 3A, 5B, 7), and the method 200 (see FIG. 8), the fore/aft point loads 142 (see FIGS. 6A-6B) transfer or jump over the load offset 146 and into in-plane loads 147 (see FIG. 6B) in the load distribution panel assembly 60 (see FIGS. 3A, 5B, 7), and transfer to the fixed structure 76 (see FIG. 6A), such as the outer blade fitting 52 (see FIG. 6A), all with minimal supporting structure or reinforcement.

Embodiments of the load distribution panel system 10 (see FIGS. 3A, 5B, 7), the load distribution panel assembly 60 (see FIGS. 3A, 5B, 7), and the method 200 (see FIG. 8) greatly reduce the amount of required structural support or reinforcement for the load path 148 (see FIGS. 6A-6B) and provide a reduced structural reinforcement 162 (see FIG. 7) for the load path 148 (see FIGS. 6A-6B), as compared to known systems, assemblies, and methods for a gas turbine engine. In addition, embodiments of the load distribution panel system 10 (see FIGS. 3A, 5B, 7), the load distribution panel assembly 60 (see FIGS. 3A, 5B, 7), and the method 200 (see FIG. 8) provide a reduced complexity 164 (see FIG. 7) of the thrust reverser assembly 26 (see FIG. 2A) and a reduced part count 166 (see FIG. 7) of the engine assembly 28 (see FIG. 2A), as compared to known systems, assemblies, and methods for a gas turbine engine. Further, compared to known systems, assemblies, and methods for a gas turbine engine, embodiments of the load distribution panel system 10 (see FIGS. 3A, 5B, 7), the load distribution panel assembly 60 (see FIGS. 3A, 5B, 7), and the method 200 (see FIG. 8) do not require the use of large metallic fittings, thick composite laminates, or secondary stiffening features to control deflections induced by the fore/aft point loads, all of which may add significant weight to the gas turbine engine, and in turn, the vehicle 12 (see FIGS. 1, 7), such as an aircraft 12a (see FIGS. 1, 7). Thus, embodiments of the load distribution panel system 10 (see FIGS. 3A, 5B, 7), the load distribution panel assembly 60 (see FIGS. 3A, 5B, 7), and the method 200 (see FIG. 8) may result in reduced weight and drag to a vehicle 12 (see FIGS. 1, 7), such as an aircraft 12a (see FIGS. 1, 7), which may, in turn, result in a reduction in fuel burn and a cost savings in the operation of the vehicle 12 (see FIGS. 1, 7), such as the aircraft 12a (see FIGS. 1, 7) and an increase in range.

The load distribution panel assembly 60 (see FIGS. 3A, 5B, 7) may preferably be made with lightweight materials because of the efficiency of the load carrying capability, and thus may reduce weight of the vehicle 12 (see FIGS. 1, 7), such as the aircraft 12a (see FIGS. 1, 7). The uniform load distribution 156 (see FIGS. 6B, 7) may reduce the amount of material used in the engine assembly 28 (see FIG. 2A), such as the engine fan case 48 (see FIGS. 2A, 6A), thus further reducing weight of the vehicle 12 (see FIGS. 1, 7), such as the aircraft 12a (see FIGS. 1, 7), while still maintaining the same structural capability. The stiffened bulb portion 82a (see FIGS. 4A, 7) of the load distribution panel assembly 60 (see FIGS. 3A, 5B, 7) simplifies the design and reduces the overall weight by about fifty (50) pounds or by about 50%, as compared to known designs of assemblies and systems for a gas turbine engine. The simple design of the load distribution panel assembly 60 (see FIGS. 3A, 5B, 7) allows for a faster production and more efficient manufacturing, thus resulting in decreased manufacturing costs. Moreover, the simple, open design of the load distribution panel assembly 60 (see FIGS. 3A, 5B, 7) allows for easy and quick inspection.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A load distribution panel assembly for providing a uniform load distribution in a thrust reverser assembly of an aircraft engine assembly in an aircraft, the load distribution panel assembly comprising:
a fan;
an engine fan case shrouding the fan;
an outer groove fitting formed in the engine fan case;
a panel structure comprising a circumferential structural panel, the circumferential structural panel comprising:
a first end attached to the engine fan case at the outer groove fitting;
a second end located forward of the first end and forming a forward movable edge of the circumferential structural panel;
a compliant barrel portion comprising a first inner surface and a first outer surface, the first inner surface facing the engine fan case and at least partially surrounding the engine fan case; and
a stiffened bulb portion coupled to the compliant barrel portion and forming an acute angle with a line coplanar with the compliant barrel portion,
the compliant barrel portion extending between the first end and the stiffened bulb portion,
the stiffened bulb portion extending radially away from the compliant barrel portion to the second end such that the second end is radially outward of the first end with respect to an engine central axis; and
the stiffened bulb portion comprising a second inner surface and a second outer surface, which is straight, parallel to and offset relative to the second inner surface, such that the second inner surface and the second outer surface form a closed stiffened cavity portion.

2. The load distribution panel assembly of claim 1, further comprising one or more clevis members, coupled to the second inner surface of the stiffened bulb portion of the circumferential structural panel and configured to couple to one or more thrust reverser actuation system (TRAS) actuators.

3. The load distribution panel assembly of claim 2, wherein each of the one or more clevis members comprises an attachment hole, engageable to a tie rod of the one or more TRAS actuators.

4. The load distribution panel assembly of claim 2, wherein the stiffened bulb portion comprises one or more attachment openings, each aligned with a corresponding one of the one or more clevis members and configured to receive a corresponding one of the one or more TRAS actuators.

5. The load distribution panel assembly of claim 1, wherein the compliant barrel portion and the stiffened bulb portion comprise a single monolithic structure.

6. The load distribution panel assembly of claim 1, wherein the stiffened bulb portion has 100 (one hundred) times to 1000 (one thousand) times greater stiffness than the compliant barrel portion.

7. The load distribution panel assembly of claim 1, wherein the stiffened bulb portion comprises a non-quasi isotropic laminate.

8. The load distribution panel assembly of claim 1, wherein a cross-section of the closed stiffened cavity portion of the stiffened bulb portion has a geometric configuration of a parallelogram, a trapezoid, a rectangle, or an ellipse.

9. The load distribution panel assembly of claim 1, wherein the second inner surface forms at least a portion of a conical shape.

10. The load distribution panel assembly of claim 1, wherein the panel structure comprises an additional circumferential structural panel, radially offset relative to the circumferential structural panel.

11. The load distribution panel assembly of claim 1, wherein the acute angle is between 25° (twenty-five degrees) and 80° (eighty degrees).

12. The load distribution panel assembly of claim 1, wherein the stiffened bulb portion further comprises a stiffened material, disposed within the closed stiffened cavity portion, and wherein the stiffened material comprises one of a honeycomb core or a foam core.

13. The load distribution panel assembly of claim 1, wherein the closed stiffened cavity portion of the stiffened bulb portion is hollow.

14. The load distribution panel assembly of claim 1, wherein the stiffened bulb portion further comprises a perimeter lip portion, extending between the closed stiffened cavity and the second end and forming a portion of the second inner surface.

15. The load distribution panel assembly of claim 1, wherein the acute angle is between 45° (forty-five degrees) and 60° (sixty degrees).

16. The load distribution panel assembly of claim 1, wherein the closed stiffened cavity of the stiffened bulb portion extends to the compliant barrel portion.

17. The load distribution panel assembly of claim 1, wherein each of the second inner surface and the second outer surface of the stiffened bulb portion extends to the compliant barrel portion.

18. The load distribution panel assembly of claim 1, further comprising an outer blade fitting, attached to the first end of the circumferential structural panel and connected to the outer groove fitting.

* * * * *